United States Patent
Ma et al.

(10) Patent No.: US 10,921,419 B2
(45) Date of Patent: Feb. 16, 2021

(54) METHODS AND APPARATUS FOR WIDEBAND LOCALIZATION

(71) Applicant: Massachusetts Institute of Technology, Cambridge, MA (US)

(72) Inventors: Yunfei Ma, Cambridge, MA (US); Nicholas Selby, Cambridge, MA (US); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 311 days.

(21) Appl. No.: 15/936,078

(22) Filed: Mar. 26, 2018

(65) Prior Publication Data

US 2018/0275246 A1 Sep. 27, 2018

Related U.S. Application Data

(60) Provisional application No. 62/476,192, filed on Mar. 24, 2017.

(51) Int. Cl.
*G01S 7/00* (2006.01)
*G01S 13/06* (2006.01)
(Continued)

(52) U.S. Cl.
CPC .............. *G01S 7/006* (2013.01); *G01S 13/06* (2013.01); *G01S 13/751* (2013.01); *G01S 13/758* (2013.01); *G01S 13/765* (2013.01)

(58) Field of Classification Search
CPC ................................. G01S 13/06; G01S 7/006
See application file for complete search history.

(56) References Cited

U.S. PATENT DOCUMENTS

| 7,898,419 B2 | 3/2011 | Cristache | |
| 2006/0033623 A1* | 2/2006 | Hines | G08B 21/0227 340/572.1 |

(Continued)

OTHER PUBLICATIONS

Azzouzi, S., et al., New measurement results for the localization of UHF RFID transponders using an Angle of Arrival (AoA) approach; published in 2011 IEEE International Conference on RFID, 2011.

(Continued)

*Primary Examiner* — Timothy X Pham
(74) *Attorney, Agent, or Firm* — Stephen R. Otis

(57) ABSTRACT

A transceiver may wirelessly transmit a communication signal at a first frequency and a sensing signal at a second frequency. The communication signal may include a command that causes a backscatter node to modulate impedance of an antenna, and thereby modulate reflectivity of the backscatter node. The communication signal may also deliver wireless power to the backscatter node. While the impedance is being modulated in response to the command, the transceiver may transmit the sensing signal and measure wireless reflections. The power of the sensing signal may be much lower than that of the communication signal. The transceiver may frequency hop the sensing signal in a wide band of frequencies and take measurements at each frequency in the hopping. Based on the measurements, a computer may determine time-of-flight or phase of a reflected signal from the backscatter node and may estimate location of the backscatter node with sub-centimeter precision.

17 Claims, 11 Drawing Sheets

(51) Int. Cl.
*G01S 13/75* (2006.01)
*G01S 13/76* (2006.01)

(56) References Cited

U.S. PATENT DOCUMENTS

| | | | | |
|---|---|---|---|---|
| 2006/0261951 | A1* | 11/2006 | Koerner | G01S 1/70 340/572.1 |
| 2007/0115137 | A1 | 5/2007 | Lyon et al. | |
| 2008/0252426 | A1* | 10/2008 | Lee | G06K 7/0008 340/10.3 |
| 2010/0289623 | A1* | 11/2010 | Roesner | G06K 7/10356 340/10.3 |
| 2011/0309969 | A1* | 12/2011 | Gravelle | G01S 13/751 342/130 |
| 2013/0321130 | A1* | 12/2013 | Waffaoui | G06K 19/0726 340/10.1 |
| 2017/0180178 | A1* | 6/2017 | Gollakota | H04L 27/2649 |
| 2018/0129834 | A1* | 5/2018 | Nikitin | G06K 7/10019 |

OTHER PUBLICATIONS

Bouet, M., et al., RFID tags: Positioning principles and localization techniques; published in 2008 1st IFIP Wireless Days.
Bouet, M. et al., A range-free 3-D localization method for RFID tags based on virtual landmarks; published in IEEE 19th International Symposium on Personal, Indoor and Mobile Radio Communications, 2008. PIMRC 2008.
Chawla, K., et al., Real-time RFID localization using RSS; published in 2013 International Conference on Localization and GNSS (ICL-GNSS), 2013.
Denk, W., et al., Two-photon laser scanning fluorescence microscopy; published in Science, vol. 248, No. 4951, pp. 73-76, Apr. 1990.
Helmchen, F., et al., Deep tissue two-photon microscopy; published in Nature Methods, vol. 2, No. 12, pp. 932-940, Dec. 20005.
Karmakar, N., et al., Chipless RFID Tag Localization; published in IEEE Transactions on Microwave Theory and Techniques, vol. 61 Issue 11, Nov. 2013.
Kronberger, R., et al., UHF RFID localization system based on a phased array antenna; published in 2011 IEEE International Symposium on Antennas and Propagation (APSURSI), 2011, pp. 525-528.
Ma, Y. et al., 3D real-time indoor localization via broadband nonlinear backscatter in passive devices with centimeter precision; published in Proceedings of the 22nd Annual International Conference on Mobile Computing and Networking MobiCom '16, pp. 216-229, Oct. 2016, ACM.
Ni, L., et al. LANDMARC: indoor location sensing using active RFID; published in Proceedings of the First IEEE International Conference on Pervasive Computing and Communications, 2003. (PerCom 2003).
Pelissier, M., et al., A 112 Mb/s Full Duplex Remotely-Powered Impulse-UWB RFID Transceiver for Wireless NV-Memory Applications; published in IEEE Journal of Solid-State Circuits; Year 2011, vol. 46, Issue 4, pp. 916-927.
Shangguan, L., et al., The Design and Implementation of a Mobile RFID Tag Sorting Robot; published in MobiSys 16, Proceedings of the 14th Annual International Conference on Mobile Systems, Applications, and Services pp. 31-42.
Yang, L., et al., Tagoram: real-time tracking of mobile RFID tags to high precision using COTS devices; published in MobiCom '14 Proceedings of the 20th annual international conference on Mobile computing and networking pp. 237-248, Sep. 2014.
Yang, Z., et al., NICScatter: Backscatter as a Covert Channel in Mobile Devices; published in MobiCom '17 Proceedings of the 23rd Annual International Conference on Mobile Computing and Networking, pp. 356-367,—Oct. 2017.
Zhou, C., et al., Accurate Phase-Based Ranging Measurements for Backscatter RFID Tags; published in IEEE Antennas and Wireless Propagation Letters; Year 2012, vol. 11, pp. 152-155.
Zhou, J., et al., RFID localization algorithms and applications—a review; published in Journal of Intelligent Manufacturing; vol. 20, Issue 6, (Dec. 2009), pp. 695-707.
Zhou, J. et al., Two-dimension localization of passive RFID tags using AOA estimation; published in 2011 IEEE Instrumentation and Measurement Technology Conference (I2MTC), 2011.

* cited by examiner

801 — AN RFID READER TRANSMITS A FIRST WIRELESS SIGNAL AT A FIRST FREQUENCY THAT IS WITHIN AN ISM COMMUNICATION BAND OF AN RFID TAG (902 MHZ - 928 MHZ). THE RFID TAG HARVESTS RF ENERGY FROM THE FIRST SIGNAL. THE FIRST SIGNAL MAY HAVE AN AVERAGE EIRP OF APPROXIMATELY 36 DBM. THE FIRST SIGNAL INCLUDES A MESSAGE THAT TRIGGERS THE RFID TAG TO PERFORM SWITCHING OPERATIONS THAT MODULATE IMPEDANCE IN THE RFID TAG. THE SWITCHING OPERATION MAY COMPROMISE A SWITCH IN THE RFID TAG RAPIDLY CHANGING BETWEEN AN OPEN AND CLOSED STATE. IN THE OPEN STATE OF THE SWITCH, THE TAG'S ANTENNA IS LESS REFLECTIVE, IMPEDANCE IS HIGH, AND POWER FLOWS INTO THE TAG'S POWER HARVESTING UNIT. IN THE CLOSED STATE OF THE SWITCH, THE TAG'S ANTENNA IS MORE REFLECTIVE, IMPEDANCE IS SLOW, AND THE ANTENNA IS GROUNDED.

802 — WHILE THE RFID TAG MODULATES IMPEDANCE IN THE TAG (AND THEREBY MODULATES POWER OF RF REFLECTIONS THAT REFLECT FROM THE TAG), THE RFID READER: (A) TRANSMITS A SECOND WIRELESS SIGNAL AT A SECOND FREQUENCY; AND (B) TAKES MEASUREMENTS OF REFLECTED RF SIGNALS, INCLUDING REFLECTIONS OF THE SECOND SIGNAL FROM THE TAG. THE SECOND SIGNAL MAY BE AT A MUCH LOWER POWER THAN THE FIRST SIGNAL (E.G., -13.3 DBM AVERAGE EIRP). THE SECOND SIGNAL REFLECTS FROM THE RFID TAG AND IS MODULATED, IN POWER, BY THE MODULATION OF IMPEDANCE IN THE TAG.

803 — THE RFID READER FREQUENCY HOPS THE SECOND SIGNAL THROUGH A WIDE BAND OF FREQUENCIES (E.G., ONE FREQUENCY AT A TIME). FOR EXAMPLE, THE FREQUENCY HOPPING MAY BE IN A FREQUENCY BAND THAT HAS A BANDWIDTH OF AT LEAST 200 MHZ AND THAT IS ENTIRELY OR PARTIALLY OUTSIDE OF THE ISM BAND. AT EACH SPECIFIC FREQUENCY IN THE FREQUENCY HOPPING, RESPECTIVELY, STEPS 801 AND 802 ARE REPEATED WITH THE SECOND FREQUENCY BEING EQUAL TO THE SPECIFIC FREQUENCY. THIS RESULTS IN A SET OF MEASUREMENTS TAKEN BY THE RFID READER AT DIFFERENT TIMES AND DIFFERENT FREQUENCIES.

804 — A COMPUTER RECOVERS THE CHANNELS OF THE SECOND SIGNAL AT EACH OF THE DIFFERENT FREQUENCIES.

FROM 804
FIG. 8A

A COMPUTER CALCULATES AN INITIAL DISTANCE ESTIMATE, BY PERFORMING AN IFRFT (INVERSE FRACTIONAL FOURIER TRANSFORM) AND THEN SELECTING A TIME-OF-FLIGHT THAT CORRESPONDS TO THE FIRST LARGE PEAK IN THE RESULTING DELAY PROFILE. — 805

A COMPUTER FILTERS THE SECOND SIGNAL IN SUCH A WAY AS TO REINFORCE THE SIGNAL STRENGTH FOR LOS (LINE-OF-SIGHT) REFLECTIONS AND TO REDUCE THE SIGNAL STRENGTH FOR NLOS (NON-LINE-OF-SIGHT) MULTIPATH REFLECTIONS. THIS FILTERING IS PERFORMED FOR EACH FREQUENCY CHANNEL OF THE SECOND SIGNAL. — 806

BASED ON PHASE, A COMPUTER ESTIMATES, FOR EACH FREQUENCY CHANNEL OF THE SECOND SIGNAL, A SMALL NUMBER OF CANDIDATE DISTANCES (BETWEEN READER AND TAG) THAT ARE CLOSE TO THE INITIAL DISTANCE ESTIMATE. — 807

A COMPUTER IDENTIFIES CLUSTERS OF THE CANDIDATE DISTANCES (ONE CANDIDATE DISTANCE PER FREQUENCY CHANNEL), SELECTS THE CLUSTER WHICH HAS THE SMALLEST WCSS (WITHIN-CLUSTER SUM OF SQUARES), AND THEN CALCULATES A REFINED ESTIMATE OF DISTANCE (BETWEEN READER AND TAG). THIS REFINED ESTIMATE OF DISTANCE IS EQUAL TO THE MEAN OF THE DISTANCES OF THE SELECTED CLUSTER, AND IS USUALLY MORE PRECISE (CLOSER TO ACTUAL DISTANCE) THAN THE INITIAL DISTANCE ESTIMATE. — 808

A COMPUTER MAY, BASED ON MEASUREMENTS TAKEN BY ONE ANTENNA OF THE RFID READER, CALCULATE DISTANCE BETWEEN READER AND TAG. A COMPUTER MAY, BASED ON MEASUREMENTS TAKEN BY TWO ANTENNAE OF THE RFID READER, CALCULATE 2D LOCATION OF THE TAG. A COMPUTER MAY, BASED ON MEASUREMENTS TAKEN BY THREE ANTENNAE OF THE RFID READER, CALCULATE 3D LOCATION OF THE TAG. IN EACH CASE, THE COMPUTER MAY EMPLOY ONE OR MORE REFINED DISTANCE ESTIMATES FROM STEP 808. — 809

FIG. 8B

| | |
|---|---|
| A TRANSCEIVER TRANSMITS A FIRST WIRELESS SIGNAL AT A FIRST FREQUENCY THAT IS WITHIN THE COMMUNICATION BAND OF A BACKSCATTER NODE. IN SOME CASES, THE BACKSCATTER NODE HARVESTS RF ENERGY FROM THE FIRST NODE. THE FIRST SIGNAL CAUSES THE BACKSCATTER NODE TO PERFORM SWITCHING OPERATIONS THAT MODULATE IMPEDANCE IN THE BACKSCATTER NODE. | 1001 |
| WHILE THE BACKSCATTER NODE MODULATES IMPEDANCE IN THE BACKSCATTER NODE (AND THEREBY MODULATES AMPLITUDE OF RF REFLECTIONS THAT REFLECT FROM THE BACKSCATTER NODE), THE TRANSCEIVER: (A) TRANSMITS A SECOND WIRELESS SIGNAL AT A SECOND FREQUENCY; AND (B) TAKES MEASUREMENTS OF REFLECTED RF SIGNALS, INCLUDING REFLECTIONS OF THE SECOND SIGNAL FROM THE BACKSCATTER NODE. THE SECOND SIGNAL MAY BE AT A MUCH LOWER POWER THAN THE FIRST SIGNAL. THE SECOND SIGNAL REFLECTS FROM THE BACKSCATTER NODE AND IS MODULATED, IN POWER, BY THE MODULATION OF IMPEDANCE IN THE BACKSCATTER NODE. | 1002 |
| THE TRANSCEIVER FREQUENCY HOPS THE SECOND SIGNAL THROUGH A WIDE BAND OF FREQUENCIES (E.G., ONE FREQUENCY AT A TIME). FOR EXAMPLE, THE FREQUENCY HOPPING MAY BE IN A FREQUENCY BAND THAT HAS A BANDWIDTH OF AT LEAST 200 MHZ AND THAT IS ENTIRELY OR PARTIALLY OUTSIDE OF THE COMMUNICATION BAND OF THE BACKSCATTER NODE. AT EACH SPECIFIC FREQUENCY IN THE FREQUENCY HOPPING, RESPECTIVELY, STEPS 1001 AND 1002 ARE REPEATED WITH THE SECOND FREQUENCY BEING EQUAL TO THE SPECIFIC FREQUENCY. THIS RESULTS IN A SET OF MEASUREMENTS TAKEN BY THE TRANSCEIVER AT DIFFERENT TIMES AND DIFFERENT FREQUENCIES. | 1003 |
| A COMPUTER EXTRACTS, FROM THE MEASUREMENTS, THE REFLECTED SECOND SIGNAL FROM THE BACKSCATTER NODE AT THE DIFFERENT FREQUENCIES OF THE FREQUENCY HOPPING. BASED ON THIS EXTRACTED SIGNAL, A COMPUTER ESTIMATES PHASE OR TIME-OF-FLIGHT OF THE SECOND SIGNAL AND CALCULATES 1D, 2D OR 3D SPATIAL COORDINATES OF THE BACKSCATTER NODE. | 1004 |

FIG. 10

METHODS AND APPARATUS FOR WIDEBAND LOCALIZATION

RELATED APPLICATIONS

This application claims the benefit of U.S. Provisional Application No. 62/476,192 filed Mar. 24, 2017 (the "Provisional").

FIELD OF TECHNOLOGY

The present invention relates generally to wideband localization.

SUMMARY

In illustrative implementations of this invention, the spatial coordinates of a backscatter node are detected with super-resolution (e.g., less than 1 centimeter) based on time-of-flight (or phase) of radio signals that reflect from, and are modulated by, the backscatter node. For instance, the backscatter node may comprise an RFID tag, a Wi-Fi transceiver, a Bluetooth® transceiver, or a Zigbee® transceiver. Or, for instance, the backscatter node may comprise an RF-energy harvesting sensor employed or any other device that receives power by WPT (wireless power transfer).

In illustrative implementations, this super-resolved localization is achieved even though the bandwidth of the communication band (or wireless power transfer band) of the backscatter node is narrow. For example: (a) the backscatter node may be an RFID tag; and (b) the RFID tag may communicate (and receive wireless power) in an ISM band between 902 MHz and 928 MHz. The 26 MHz bandwidth of this ISM band is too narrow to support high precision localization by time-of-flight.

In illustrative implementations, a wide bandwidth (e.g., far wider than 26 MHz) is desirable, because time resolution improves as bandwidth increases. That is, the wider the bandwidth, the better the time resolution and distance resolution. Put differently, the wider the bandwidth, the smaller the interval of time that can be resolved (and thus the smaller the distance that can be resolved with time-of-flight and the more precise the localization that can be achieved with time-of-flight).

In illustrative implementations, a wide bandwidth of RF signals is achieved (e.g., by frequency hopping), in order to support super-resolved localization with time-of-flight measurements. For instance, the wide bandwidth that is achieved may be greater than or equal to 20 MHz, or greater than or equal to 200 MHz.

In some implementations, a communication signal is employed for communication with (and if applicable WPT to) a backscatter node. The communication signal may differ—in frequency and in power—from a sensing signal employed to localize the backscatter node.

For instance, the communication signal may be at a single frequency that is in a first, narrow band of frequencies. This first, narrow band of frequencies (for communication or power) may be mandated by government regulation. However, the sensing signal may be in a second, much wider band of frequencies that is different than (and at least partially outside of) the first narrow band of frequencies. The sensing signal may be frequency-hopped or swept, to emulate a wide bandwidth. Or, the sensing signal may be wideband at any given time. In some cases, the communication signal has a higher power—or a lower power—than the sensing signal.

For example, an RFID reader may transmit a communication signal to communicate with, and to wirelessly power, an RFID tag. This communication signal may be at a specific frequency in the 902 MHz-928 MHz ISM band, and may include an RFID query message.

In this example, the RFID reader may also transmit a sensing signal that is employed for localizing the RFID tag by time-of-flight measurements. The sensing signal may be frequency hopped (e.g., one frequency at a time) within a band of frequencies that has a bandwidth of at least 200 MHz. The RFID reader may measure reflected RF signals (including RF signals reflecting from the RFID tag) while the sensing signal is at each different frequency, respectively, in the frequency hopping. These measurements taken by the RFID reader at different times at different frequencies may emulate measurements that would occur if the RFID reader were to take measurements at a single time during a wideband transmission.

In this example, the communication signal (for communication and/or power) may be transmitted at a much higher power than the sensing signal (for localization). The RFID reader may transmit the first signal within the ISM band at an EIRP (effective isotropic radiated power) around 36 dBm, in order to provide sufficient wireless power to power the RFID tag. However, the RFID reader may transmit the second signal outside the ISM band at an average EIRP of −13.3 dBm, in order to comply with an FCC (Federal Communication Commission) regulation.

In illustrative implementations: (a) a backscatter node modulates the power of a backscattered signal by rapidly changing impedance in an antenna of the backscatter node; and (b) a transceiver simultaneously takes time-of-flight measurements.

In some cases, impedance modulation in the backscatter node causes modulation of a sensing signal that reflects from the backscatter node. For instance, in some cases, a transceiver transmits a communication signal at a first frequency. A backscatter node may respond to the communication signal by modulating impedance in the backscatter node, which in turn modulates the RF reflections that reflect from the backscatter node. While the backscatter node is modulating impedance, the transceiver (e.g., RFID reader) may transmit the sensing signal at a second frequency. Thus, the impedance modulations in the backscatter node may modulate the power of reflections of the sensing signal that reflect from the backscatter node.

In some implementations, during the modulation of impedance (in response to the communication signal), the following processes may occur simultaneously: (1) the transceiver may transmit the sensing signal at a specific frequency (in the frequency hopping) which is different than the frequency of the communication signal and may be outside the conventional communication band of the backscatter node; (2) the modulation of impedance in the backscatter node may modulate reflections from the backscatter node (including by modulating amplitude or power of reflections of the sensing signal); and (3) the transceiver may take measurements of RF reflections from objects in the transceiver's environment, including reflections from the backscatter node.

In some implementations, the modulation of impedance is performed by dedicated hardware in the backscatter node. This modulation of impedance may in turn modulate the amplitude or power of signals that reflect from the backscatter node. For instance, in an RFID tag, the modulation of impedance may be performed by a dedicated circuit that includes a switch. The RFID tag may switch rapidly between: (a) a more reflective state and (b) a less reflective state. In the more reflective state, a switch in the RFID tag may be closed, causing the tag's antenna to be connected to ground, impedance in a circuit that includes the tag's antenna to be zero (or close to zero), and more RF power to be reflected by the tag's antenna. In the less reflective state, the switch in the RFID tag may be open, causing RF power to flow into the tag's power harvesting unit, impedance in a circuit that includes the tag's antenna to be high, and less RF power to be reflected by the tag's antenna. The switch in the RFID tag that is employed for this modulation (of impedance and reflectivity) may comprise a transistor.

Alternatively, in some implementations of this invention, the modulation of impedance in the backscatter node is performed by hardware that is not dedicated solely to the task of modulating RF reflections from the backscatter node. For instance, in a Wi-Fi device or Bluetooth® device, a network interface card (NIC) may be rapidly turned off and on, thereby causing a rapid modulation of impedance in the NIC, which in turn causes a rapid modulation of RF signals that passively backscatter from the Wi-Fi device or Bluetooth® device. This rapid switching of the state of the NIC: (a) may be triggered by a communication signal that is transmitted by a transceiver at a first frequency in the communication band of the Wi-Fi device or Bluetooth® device; and (b) may occur while the transceiver is transmitting a sensing signal at a different frequency.

More generally, switching operations may be performed in a backscatter node (e.g., an RFID tag, a Wi-Fi device, a Bluetooth® device, a Zigbee® device, or an RF energy harvesting sensor). These switching operations: (a) may change impedance in the backscatter node and thereby modulate power of RF signals that reflect from the backscatter node; and (b) may be in response to a first signal that is transmitted by a transceiver at a first frequency in the communication band of the backscatter node. Furthermore, these switching operations (and thus modulation of impedance and reflected power) may occur while the transceiver is transmitting a second signal at a different frequency which, in many cases, is outside the communication band of the backscatter node. The transceiver may frequency hop the second signal and, at each frequency in the frequency hopping, take measurements of reflected signals, including reflections of the second signal that reflect from, and are modulated by, the modulation of impedance in the backscatter node.

Thus, in illustrative implementations, a transceiver takes measurements of reflected signals at different times while the backscatter node modulates its impedance and thus modulates reflections from the backscatter node. For instance, the transceiver may take measurements while the transceiver transmits at each different frequency in frequency hopping of the second signal, respectively, one frequency at a time.

A computer may extract, from these measurements, the second signal reflected from the backscatter node at each of the different frequencies in the frequency hopping. The computer may determine time-of-flight (or phase) of this second signal, and, based on this time-of-flight (or phase), may determine the 1D, 2D or 3D position of the backscatter node. In some cases, the localization of the backscatter node is super-resolved. For instance, the system may in some cases detect the position of the backscatter node with sub-centimeter precision.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 8A and 8B comprise a flowchart for a method of localizing an RFID tag.

FIG. 10 is a flowchart for a method of localizing one or more backscatter nodes.

Figure 1A:
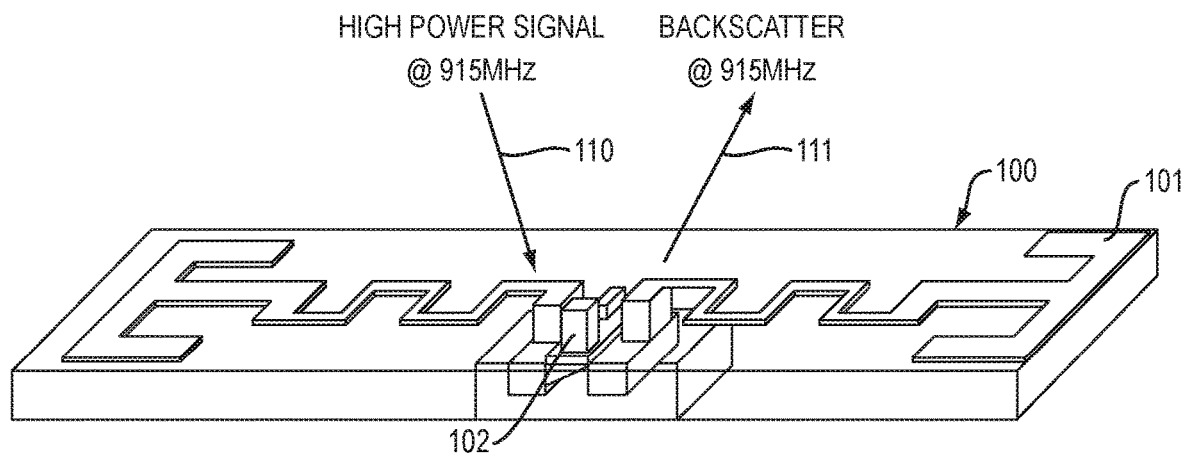
FIG. 1A shows a high-power signal at 915 MHz striking, and reflecting from, an RFID tag.

The above Figures show some illustrative implementations of this invention, or provide information that relates to those implementations. The examples shown in the above Figures do not limit this invention. This invention may be implemented in many other ways.

DETAILED DESCRIPTION

Overview

In this Detailed Description, we shall first discuss implementations of this invention in which the backscatter node is an RFID (radio frequency identification) tag. Among other things, we will discuss bandwidth, modulation of impedance, and localization of the RFID tag.

We will also describe a specific RFID prototype and the very accurate localization achieved by the prototype.

Then, we shall discuss a wide variety of backscatter nodes which may employed in this invention. We will describe how the location of a backscatter node may be determined with great (e.g., sub-centimeter) precision, based on RF signals that reflect from the backscatter node. The backscatter node may comprise, for instance, an RFID tag, a Wi-Fi transceiver, a Bluetooth® transceiver, a Zigbee® transceiver, an RF-energy harvesting sensor, or any other device that is wirelessly powered.

RFID—Wide Bandwidth/Modulation of Impedance

In some implementations of this invention, the location of RFID tags is accurately determined, by using a high-power signal at a first frequency in the 902-928 MHz ISM band for power delivery and communication, and by using a low-power signal for location sensing. The low-power signal may be frequency hopped through a wide bandwidth (e.g., at least 200 MHz) thereby emulating a wideband signal. An RFID reader may take measurements of reflections of the low-power sensing signal throughout this wide bandwidth. Based on these measurements, the time-of-flight (or phase) of the sensing signal may be determined. Based on the time-of-flight (or phase), location of RFID tags may be determined with great accuracy (e.g., sub-centimeter) in each of three x, y, z dimensions. This may be achieved regardless of whether the RFID reader or RFID tag move in a pre-determined path.

This approach—which leverages the benefits of a wide bandwidth—may be performed with conventional RFID passive tags that are configured to receive power and communicate in only a narrow band of frequencies (e.g. the 902-928 MHz ISM band). Furthermore, this approach may comply with FCC (Federal Communication Commission) regulations because the low power signal has a power that is below the maximum power allowed for RFID signals outside the ISM band.

The super-resolved localization achieved by this invention has many practical applications. For example, in some use scenarios, this invention enables high-precision localization of on-body RFID tags that track multiple limbs of a human user, where the position or movement of the limbs comprises an input to control a computer (e.g., to control a game). Furthermore, in some use scenarios, accurate RFID localization enables employees to check the number of items in a box or whether the right item is in the right box even after the box is sealed. More generally, RFID localization with this invention enables many applications in retail stores, factories, warehouses, virtual reality applications, augmented reality applications, and smart environments.

In a conventional RFID system, an RFID reader transmits a high-power signal (e.g., 36 dMB) in the ISM frequency band between 902 MHz and 928 MHz. In this conventional system: (a) when a passive RFID tag receives the high-power signal, the tag powers up by harvesting RF energy from the signal; (b) the powered-up tag then modulates impedance in the tag; and (c) this modulation of tag impedance in turn modulates how reflective the tag is, and thus modulates the power of RF (radio frequency) reflections from the tag.

FIG. 1A shows a conventional RFID system in which a single high-power signal 110 with a frequency of 926 MHz strikes a passive RFID tag 100. The high-power signal causes tag 100 to power up, and also causes a transistor switch 102 in tag 100 to perform switching that changes impedance of a circuit connected to the tag's antenna 101. These changes in impedance in turn modulate the power of reflections from the tag. Thus, the backscattered signal 111 is modulated (e.g., in power). In FIG. 1A: (a) backscattered signal 111 is also at 926 MHz; and (b) a conventional RFID reader is transmitting at only a single frequency.

A disadvantage of the conventional approach shown in FIG. 1A is that the transmitted high-power signal does not have a wide bandwidth, and thus cannot be used for super-resolved localization of the RFID tag. (Recall that distance resolution may improve—i.e., minimum distance resolvable by the system may become smaller—as bandwidth increases).

Figure 1B:
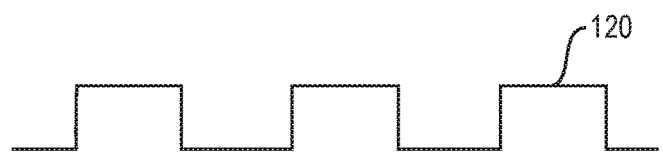
FIG. 1B illustrates a modulation pattern.

FIG. 1B illustrates a modulation pattern 120. In some cases, this modulation pattern is both: (a) the pattern in which impedance in a circuit that is connected to the tag's antenna is modulated; and (b) the resulting pattern of modulation of reflected power of signals reflecting from the tag.

Figure 1C:
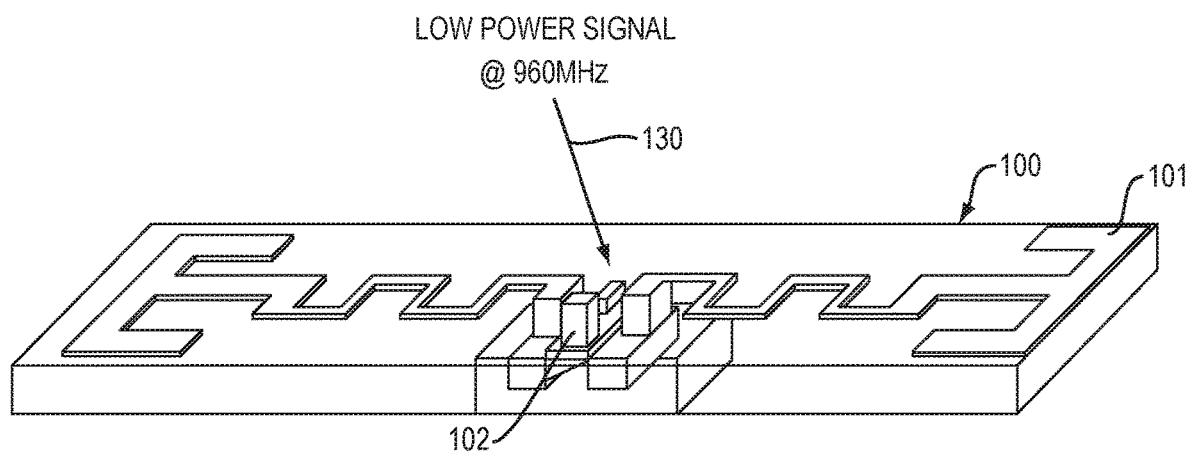
FIG. 1C illustrates a low-power signal at 960 MHz that does not power up the RFID tag.

Typically, if an RFID reader were to transmit only a single, very low power signal at a frequency outside the ISM 902-928 MHz band, a passive RFID tag would not power up in response. FIG. 1C illustrates a single, low-power signal 130 at 960 MHz that does not power up the RFID tag. The power (e.g., −13.3 dBm) of signal 130 is so low that the signal does not power up tag 100, and thus tag 100 does not modulate reflections of signal 130 from the tag.

In some implementations of this invention, an RFID reader transmits two wireless signals simultaneously: (a) a high-power signal in the ISM band and (b) a low-power signal that is typically outside the ISM band. The first signal may be high-power (e.g., average EIRP of 36 dBm) and may be at a frequency (e.g., 915 MHz) in the 902-928 MHz ISM band. The first signal may be employed for communicating with the tag and for delivering wireless power to the tag. In response to the first signal, the RFID tag may power up and then perform switching operations that modulate impedance in the tag, which in turn modulates how reflective the tag is. The second signal may be extremely low power (e.g., −13.3 dBm) and may be at a frequency (e.g., 960 MHz) that is outside the 902-928 MHz ISM band. The second signal may be employed for sensing the location of the tag. The modulation of impedance in the tag may, in turn, modulate the power of reflections (reflecting from the tag) of the first and second signals.

Figure 1D:
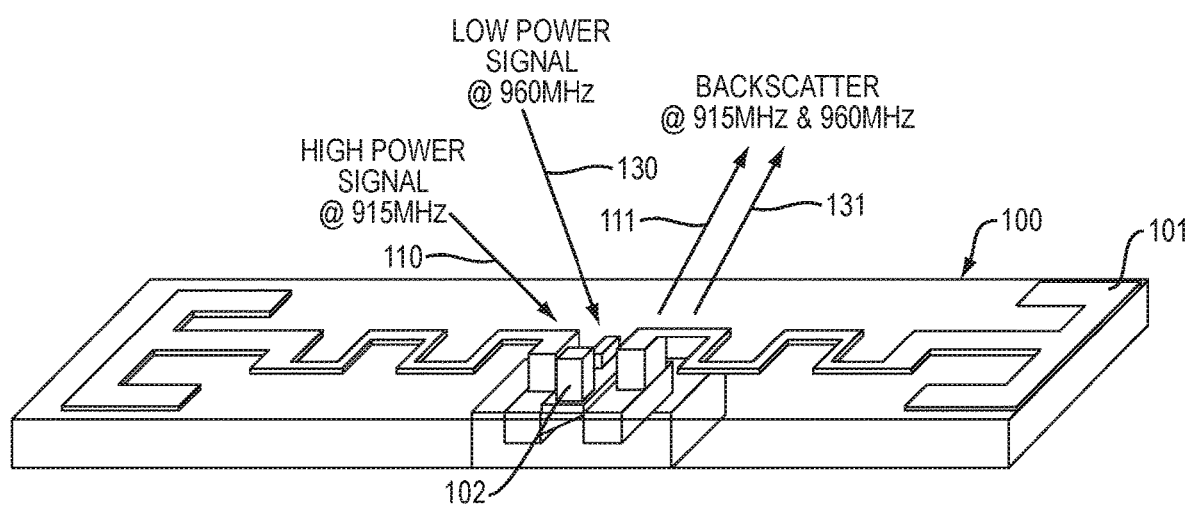
FIG. 1D illustrates two signals simultaneously striking, and reflecting from, an RFID tag. The first signal is a high-power signal at 915 MHz; the second signal is a low-power signal at 960 MHz.

FIG. 1D illustrates two signals simultaneously striking, and reflecting from, an RFID tag, in an illustrative implementation of this invention. In FIG. 1D, the first signal 110 (and its reflection 111) are each a high-power signal at 915 MHz. Likewise, in FIG. 1D, the second signal 130 (and its reflection 131) are each a low-power signal at 960 MHz.

In illustrative implementations, localization sensing and wireless power delivery are decoupled by transmitting different signals at different frequencies. For instance, a transceiver may transmit two wireless signals: (a) a first signal at frequency $f_p$; and (b) a second signal at frequency $f_s$. The first signal may be employed for power delivery and communication, and the second signal may be employed for sensing. For instance, the first signal $f_p$ may be transmitted in the 902 MHz-923 MHz ISM band 301 at a high power (e.g., an average EIRP of 36 dBm). A passive tag may harvest RF energy from the first signal $f_p$. Furthermore, the passive tag and reader may communicate with each other via the first signal $f_p$ (e.g., pursuant to the EPC Gen2 protocol). The second signal $f_s$ may be transmitted at a low power (e.g., −13.3 dBm) in a frequency hop (e.g., one frequency at a time) over a wide range of frequencies that includes, but is much wider than, the 902-928 MHz ISM band. Reflections of the second signal $f_s$ may be measured by the reader, to determine 1D, 2D or 3D spatial coordinates of the reader.

In some implementations, this invention leverages the fact that RFID modulation is frequency agnostic—that is, the modulation occurs over a wide range of frequencies, including frequencies far outside the 902-928 MHz ISM band that is used for RFID power delivery and communication.

In some implementations of this invention, RFID tags communicate with a wireless device called an RFID reader through backscatter technology. The reader may transmit a continuous wave at some frequency, and the RFID tag may switch its internal impedance between two states—reflective and non-reflective—to communicate bits to the reader. By sensing subtle changes in the reflected signal due to the tag's impedance changes, an RFID reader may decode the bits communicated by the tag. These impedance changes may be sensed at various frequencies.

In some implementations of this invention, an RFID reader generates a virtual localization bandwidth that is multiple orders of magnitude larger than the bandwidth of conventional RFID communication. Rather than transmitting a continuous wave at only a single frequency, an RFID reader may transmit continuous waves at multiple frequencies, as shown in FIG. 1D. When an RFID tag switches its internal impedance to "reflective", it may reflect all the transmitted frequencies. On the other hand, when it changes its internal impedance to "non-reflective", it may absorb all of the transmitted frequencies. This may enable the RFID reader to estimate the channel of the RFID tag at all the reflected frequencies. A large bandwidth may enable the RFID reader to accurately compute time-of-flight (or phase) and use it to localize the RFID tag.

In some implementations, the RFID reader: (a) does not acquire the entire wide bandwidth at once; but (b) instead performs frequency hopping to emulate a large virtual localization bandwidth in the time domain. For instance, at every point in time, the RFID reader may transmit at only two frequencies (one inside the ISM band and another outside the ISM band). Over time, the RFID reader may vary a carrier wave of the sensing frequency and may estimate the channel at that frequency. Then, a computer may stitch together the channels at the various frequencies obtained from an RFID tag over time. This is possible because there is no carrier frequency offset (CFO) across time measurements since the signals being measured are passive reflections (backscatter) of the reader's signal. Thus, in some implementations of this invention, the RFID reader may transmit at a very narrow bandwidth at every point in time and may operate entirely within the bandwidth (and sampling rate) capabilities of RFID readers on the market.

In some implementations, the large virtual localization bandwidth is leveraged to tease apart the various multi-paths in the environment, and identify the path that arrives earliest in time as the LOS (line-of-sight) path for localization. Then, super-resolved localization may be employed to determine, based on the LOS path, the location of the RFID tag.

In some implementations, this invention may employ any type of backscatter modulation, including FM0 and Miller-8.

In some implementations, this invention is fully compliant with the RFID communication protocol (the EPC Gen2).

In some implementations, this invention may operate in both LOS (line-of-sight) and NLOS (non-line-of-sight) environments, including highly cluttered NLOS environments.

In some implementations, a computer estimates time-of-flight from an RFID reader to an RFID tag, based on measurements of reflected RF signals taken by an RFID reader. The computer may map the time-of-flight to distance by taking into account the propagation speed of RF signals. To perform 1D localization, one receive antenna may be used. To perform 2D or 3D localization, two or three receive antennas respectively may be employed, and trilateration may be performed.

Figure 2A:
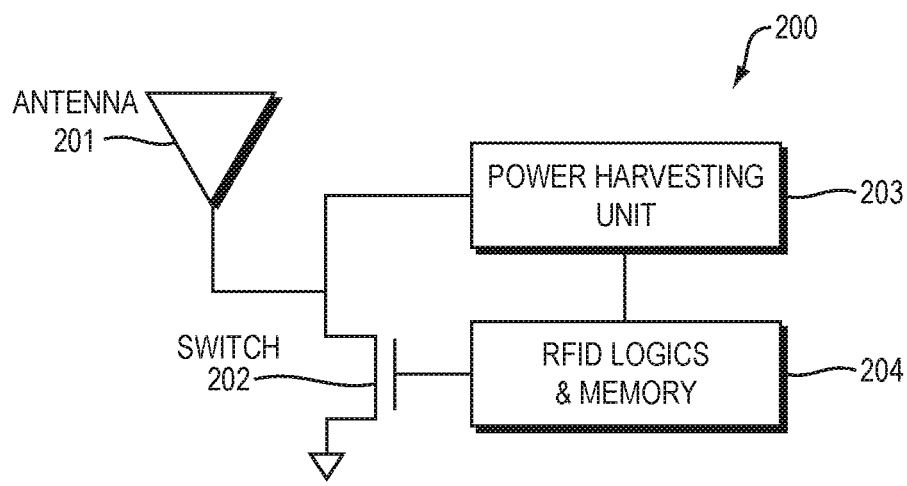
FIG. 2A shows hardware of an RFID tag, including a switch in the tag.

FIG. 2A shows hardware of an RFID tag. In FIG. 2A, tag 200 includes an antenna 201, a switch 202, a power harvesting unit 203, and a Logics & Memory module 204. Module 204 may include a computer (e.g., microcontroller) and a memory device.

Typically, a passive RFID tag modulates impedance in a circuit that is electrically connected to the tag's antenna (and thus the tag modulates how reflective the tag is) by changing the state of a switch. For instance, the switch may comprise a transistor.

Figure 2B:
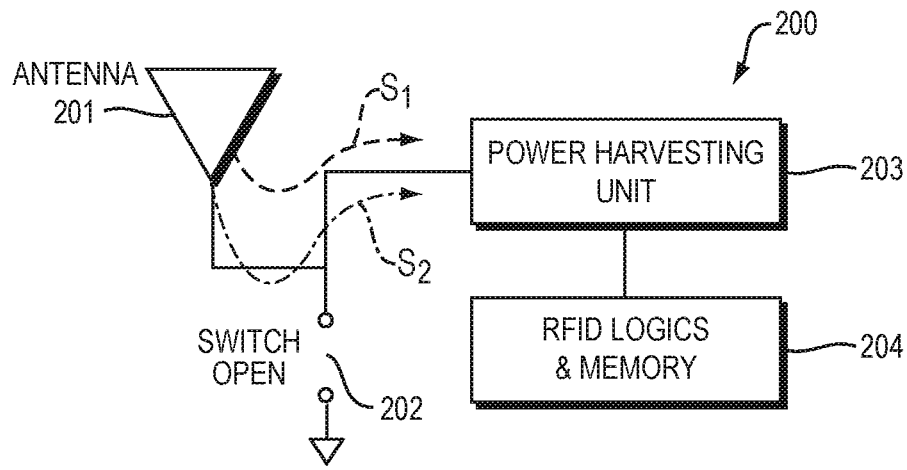
FIG. 2B shows the RFID tag when the switch is open, impedance is high, and the tag is less reflective.
Figure 2C:
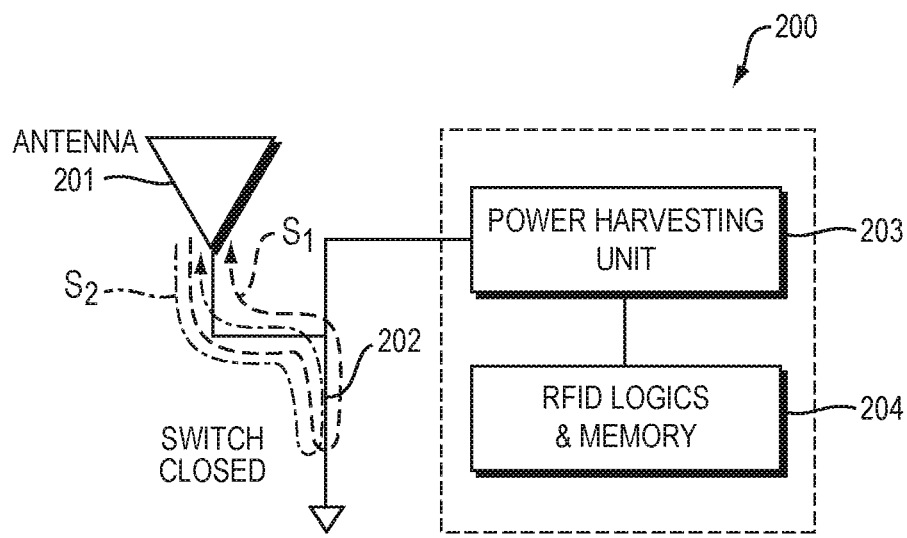
FIG. 2C shows the RFID when the switch is closed, impedance is low, and the tag is more reflective.

FIGS. 2B and 2C, taken together, illustrate how reflectivity of an RFID tag may be modulated by rapidly switching between open and closed states of the switch.

FIG. 2B shows RFID tag 200 when switch 202 is open. In FIG. 2B, when switch 202 is open: (a) impedance (in a circuit that is electrically connected to antenna 201) is high; (b) power flows into power harvesting unit 203; and (c) the tag is less reflective.

FIG. 2C shows the RFID tag 200 when switch 202 is closed. In FIG. 2C, when switch 202 is closed: (a) impedance (in a circuit that is electrically connected to antenna 201) is low; (b) tag antenna 201 is grounded; and (c) the tag is more reflective.

In FIGS. 2B and 2C: (a) two signals ($s_1$ and $s_2$) are simultaneously striking and reflecting from tag 200; (b) the first signal $s_1$ is a high-power (e.g., 36 dBm) signal in the 902-928 MHz IMS band; and (c) the second signal $s_2$ is a low-power (e.g., −13.3 dBm) signal that may be outside the 902-928 MHz band.

In some implementations, an RFID reader does not transmit a single frequency $f_1$ as in today's RFID protocol. Instead, the RFID reader may transmit at multiple frequencies, e.g., $f_1$ and $f_2$. When a transistor switch in the RFID tag is open, the tag absorbs both frequencies as shown in FIG. 2B; when it is closed, the tag reflects both frequencies as shown in FIG. 2C.

In some implementations, a high SNR (signal-to-noise ratio) is achieved over a wide band of frequencies. This, in turn, allows an RFID reader to take measurements while frequency hopping a sensing signal through a wide band of frequencies. As noted above, it is desirable to take measurements over a wide band of frequencies, because the wider the band, the better the time resolution and distance resolution.

Figure 3:
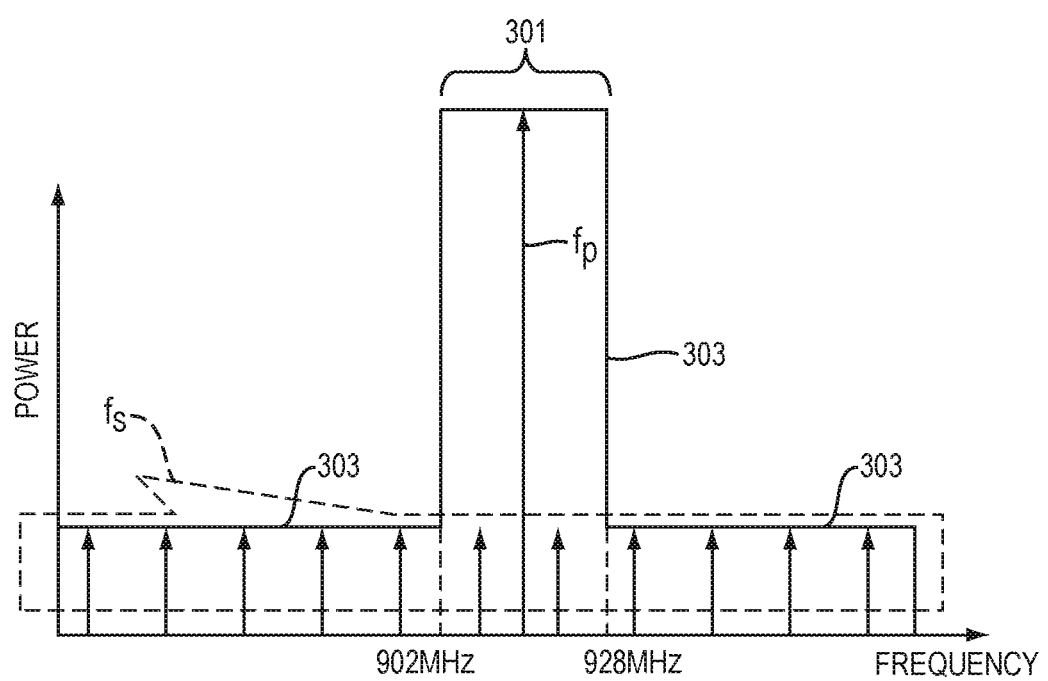
FIG. 3 illustrates decoupling of localization sensing and wireless power delivery.

In FIG. 3, both the first and second signals (at $f_p$ and $f_s$, respectively) comply with an FCC (Federal Communications Commission) regulation which allows high power for unlicensed RFID communications within ISM band 301 but allows only extremely low power (≤−13.3 dBm) outside of the band. In FIG. 3, line 303 shows the maximum power permitted by this FCC regulation, as a function of frequency.

In some implementations, a high SNR (signal-to-noise ratio) is achieved over a wide band of frequencies. This, in turn, allows an RFID reader to take measurements while frequency hopping a sensing signal through a wide band of frequencies. As noted above, it is desirable to take measurements over a wide band of frequencies, because the wider the band, the better the time resolution and distance resolution.

In some implementations, to sense the channel over a wide bandwidth, the RFID reader may vary $f_s$ over time and collect channel measurements.

Figure 4:
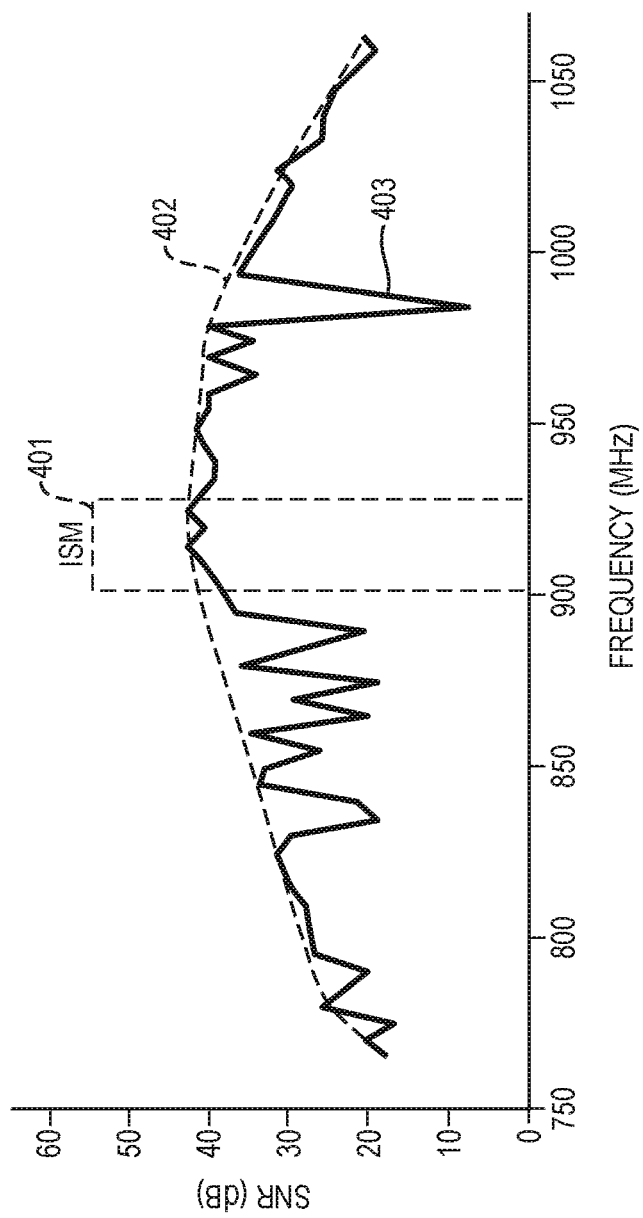
FIG. 4 shows SNR (signal-to-noise ratio) of an RFID tag's response, as a function of frequency.

FIG. 4 shows SNR (signal-to-noise ratio) 403 of an RFID tag's response, as a function of frequency $f_s$ of the sensing signal. As shown in FIG. 4, the sensing signal has a high SNR over a range of frequencies that extends far beyond the ISM band. In FIG. 4, the envelope 402 of the SNR 403 of the tag's response to the sensing signal $f_s$ is greater than 10 dB over more than 300 MHz, even though the sensing signal is extremely low power outside ISM band 401.

RFID—Channel Recovery

In some implementations: (a) an RFID reader measures an RFID tag's response at different sensing frequencies; and (b) a computer recovers the channels at each of these frequencies. For channel recovery, any channel estimation technique may be employed.

For instance, in some implementations, a computer may use the known preamble $p_t$ of the tag's response $y_t$ to obtain an estimate of the channel $h_k$ at a given sensing frequency $f_k$ as follows:

$$h_k = \sum_t y_t p_t^* \qquad \text{(Equation 1)}$$

By repeating this operation over different sensing frequencies, a computer may obtain channel estimates $\{h_1 \ldots h_K\}$ over a wide bandwidth.

RFID—EPC Gen2 Protocol

In some implementations of this invention, the signals transmitted by the RFID reader are compatible with the EPC Gen2 protocol for RFID communication. For instance, an RFID reader may transmit at two frequencies rather than one at a third stage of a communication session.

Figure 5:
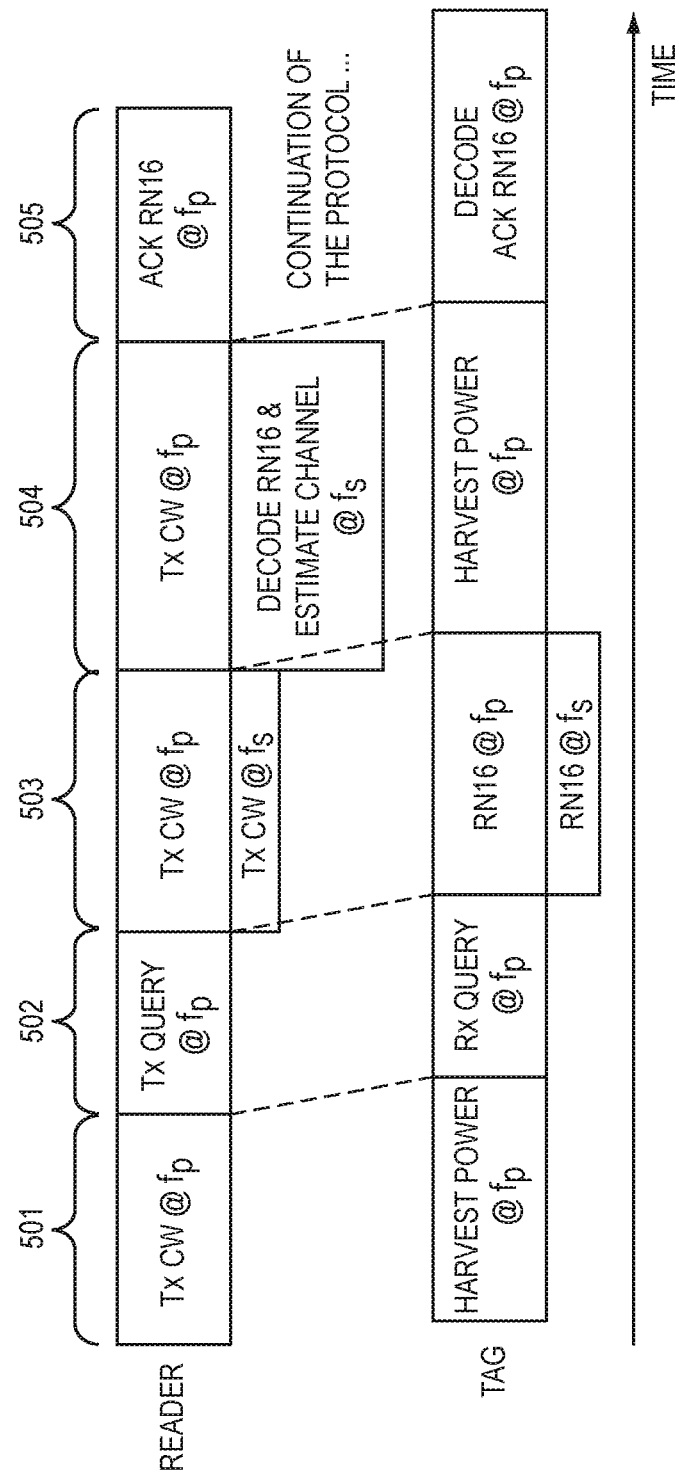
FIG. 5 is a diagram that shows how a high-power signal in the ISM band and a low-power signal outside the ISM band may be employed simultaneously in a manner compatible with the EPC Gen2 protocol.

FIG. 5 is a diagram that shows how a high-power signal in the ISM band and a low-power signal outside the ISM band may be employed simultaneously in a manner that is compatible with the EPC Gen2 protocol.

In FIG. 5, during a first time interval 501: (a) an RFID reader may transmit a high-power signal at frequency $f_p$ as a continuous wave; and (b) an RFID tag may simultaneously harvest RF energy from the high-power signal. In FIG. 5, frequency $f_p$ is within a 902-928 MHz ISM band. The tag harnesses power from the signal to power up and start decoding.

In FIG. 5, during a second time interval 502: (a) the reader may transmit—as part of the high-power signal at frequency $f_p$—an RFID query message; and (b) the tag may receive the query message. The query message may provide communication information (e.g., modulation, data rate) to the tag.

After a tag successfully decodes the query, it starts modulating its antenna impedance to transmit a 16-bit number called RN16. In FIG. 5, during a third time interval 503, the following three things may occur simultaneously: (a) the reader may transmit a high-power signal at frequency $f_p$ as a continuous wave; (b) the reader may also transmit a very low-power signal at frequency $f_s$ as a continuous wave; and (c) the RFID tag may, in response to the query, modulate impedance in the tag (and thus modulate amplitude of reflections from the tag) in such a way that, when the high-power and low power signals reflect from the tag, their reflections each encode a random 16 bits of data known as RN16.

In FIG. 5, during a fourth time interval 504, the following three things may occur simultaneously: (a) the reader may transmit a high-power signal at frequency $f_p$ as a continuous wave; (b) a computer may decode the RN16 and estimate the channel of the low power signal at frequency $f_s$; and (c) the tag may harvest RF energy from the high-power signal.

In FIG. 5, during a fifth time interval 505: (a) the reader may transmit, at frequency $f_p$, a high-power signal that contains an ACK command; (b) the tag may decode the ACK command; and (c) the EPC Gen2 protocol may continue.

In some cases: (a) if there is only one tag, then the RN16 may be sufficient to identify the reflection from the tag; and (b) if there are multiple tags, then data transmitted later in the EPC Gen2 protocol may be employed to uniquely identify a particular tag.

In FIG. 5: (a) the reader may transmit the high-power signal at frequency $f_p$ with an average EIRP of about 36 dBm; and (b) the reader may transmit the low-power signal at frequency $f_s$ with an average EIRP at −13.3 dBm.

The reader may frequency hop the sensing frequency $f_s$ in a wide band of frequencies, and the steps shown in FIG. 5 may be repeated, for each specific sensing frequency $f_s$ in the frequency hopping. Thus, the RFID reader and tag may repeat the steps shown in FIG. 5 at different $f_s$ carrier waves. In some cases, the RFID reader hops $f_s$ over K consecutive carriers $\{f_1, f_2, \ldots, f_K\}$ as depicted in FIG. 3 where the spacing between adjacent carriers is equal to $\Delta f$. Alternatively, a randomized hopping pattern or any sweep pattern may be used to transmit at multiple frequencies in a wide band of frequencies.

RFID—Localization

In some implementations of this invention, a computer may perform a localization algorithm that operates in two stages. First, the algorithm may tease apart the different paths traversed between an RFID and the reader, and identify the line-of-sight (LOS) path. Second, the algorithm may "zoom into" the LOS path to achieve sub-centimeter localization accuracy.

In indoor environments, RF signals may bounce off different obstacles (such as ceilings, walls, and furniture) before arriving at a receiver. This phenomenon is called the multipath effect.

In some implementations, a computer: (a) analyzes measurements taken by an RFID reader; (b) identifies the LOS path (out of all of the paths between the tag and reader, including LOS and NLOS); and (c) calculates a rough time-of-flight estimate of that LOS path.

As noted above, the system may obtain channel estimates in the frequency domain. To identify the LOS path, a computer may transform the channels from the frequency domain to the time domain—i.e., may perform an inverse Fourier transform.

Figure 6:
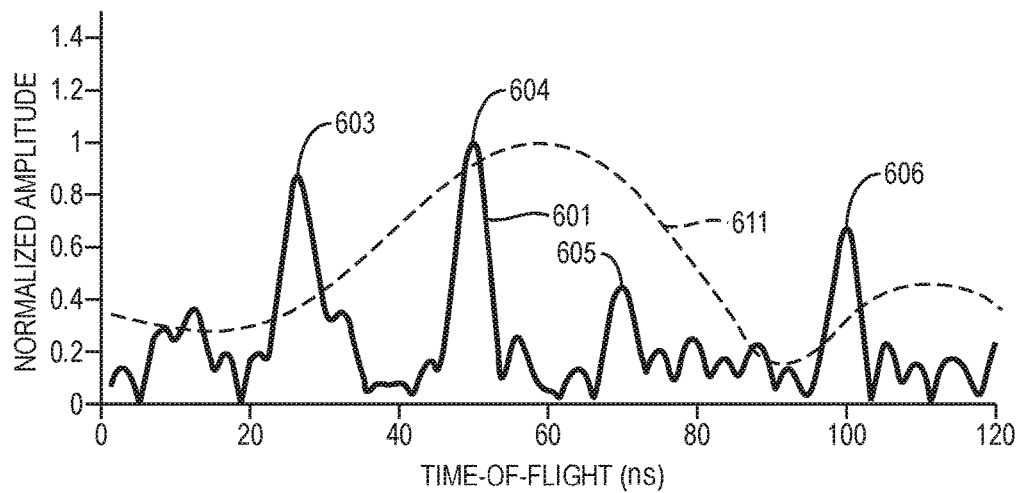
FIG. 6 shows a delay profile.

In some cases, in order to identify the LOS path, a computer may perform an Inverse Fractional Fourier Transform (IFRFT). An IFRFT is advantageous, since it incorporates an interpolation mechanism and thus provides a finer-granularity initial estimate of the time-of-flight. Mathematically, let us denote the channel estimates as $h_1, \ldots, h_K$ at K different carrier frequencies. To obtain the time domain representation, a computer may perform the following IFRFT operation:

$$S(\tau) = \sum_{k=1}^{K} h_k e^{j2\pi(k-1)\Delta f \tau} \qquad \text{(Equation 2)}$$

where $\tau$ denotes the delay in the time domain, $\Delta f$ is the frequency step used in the frequency hopping, and $S(\tau)$ is the signal in the time domain. The solid black line 601 in FIG. 6 shows an example of the output of this operation when it is performed over an emulated bandwidth of 220 MHz. FIG.

6 plots the power as a function of the delay τ. The delay profile exhibits multiple peaks, each of which corresponds to a different path traversed by the signal from the RFID tag.

In illustrative implementations, an initial distance estimate (of distance between a reader and a tag) may be calculated from a delay profile. A computer: (a) may take, as an input, a set of estimated channels, where each channel comprises reflection of a low-power signal from the tag at a specific frequency in a frequency hop of the low-power signal; and (b) may perform an Inverse Fourier Transform (e.g., an IFRFT) to calculate a delay profile. The delay profile may describe normalized power as a function of time-of-flight. The computer may select the first (in time) large peak in the delay profile, and, based on the time associated with that large peak, calculate an initial estimate of distance between the reader and the tag. For purposes of the preceding sentence, a "large" peak may be a peak that is above a specified constant threshold of normalized power.

FIG. 6 shows a delay profile. In FIG. 6, line 601 is a delay profile, which describes normalized power as a discrete function of time-of-flight. In FIG. 6: (a) the first large peak 603 in the delay profile corresponds to an LOS (line-of-sight) reflection from the tag to the reader; and (b) other large peaks in the delay profile (e.g., 604, 605, 606), which occurred later in time, correspond to NLOS (non-line-of-sight) reflections from the tag. (NLOS reflections have a longer time-of-flight because they do not travel directly between the reader and the tag, but instead reflect off or more other objects along the way). A computer: (a) may identify the first large peak 603 of the delay profile (which corresponds to LOS reflections); and (b) initially estimate that distance between reader and tag is equal to the distance that corresponds to the time-of-flight for the first large peak 603.

FIG. 6 also illustrates that a wider bandwidth results in better time resolution (and thus better distance resolution). In FIG. 6, line 601 is a delay profile calculated by performing an Inverse Fourier Transform on data derived from measurements taken at different frequencies over a wide, 220 MHz band of frequencies. In contrast, in FIG. 6, line 611 is a delay profile calculated by performing an Inverse Fourier Transform on data derived from measurements taken only within a 26 MHz bandwidth ISM band. In FIG. 6: (a) line 601 (derived from measurements over a wide band) has sufficient time resolution to resolve the different large peaks (e.g., 603, 604, 605, 6060); but (b) line 611 (derived from only a narrow 26 MHz ISM band) does not.

Thus, FIG. 6 illustrates that, if one has measurements from only a 26 MHz bandwidth, it may be difficult or impossible to tease apart the LOS path from the indirect paths. This is because when the bandwidth is smaller, the different paths may merge into each other. Mathematically, at the output of an Inverse Fourier Transform, each path is convolved with a sinc function whose width is inversely proportional to the bandwidth. Specifically, if there are L paths with delays $\{\tau_1 \ldots \tau_L\}$, we can write the output of the IFRFT as:

$$\sum_{i=1}^{L} a_i \text{sinc}(B(t-\tau_i)) \qquad \text{(Equation 3)}$$

where B is the bandwidth and $a_i$ is the complex amplitude of the corresponding path.

Hence, larger B results in fatter sinc functions. In particular, the resolution in separating multipath is the width of the sinc function main-lobe, given by:

$$\{\text{Multipath Separability}\} = 1/B \qquad \text{(Equation 4)}$$

Note that the final resolution in estimating each of the paths can be much finer.

In FIG. 6, the vertical axis is normalized amplitude. Normalizing the amplitude at different frequencies may be desirable, because the amount of reflection/absorption by an RFID tag may vary over frequency.

As noted above, measurements taken by the RFID reader may be analyzed to identify the LOS path and provide an initial distance estimate. However, this estimate may be biased by noise and by leakage from other multipath components (e.g., due to the sinc effect described in the text accompanying Equations 3 and 4)

To refine the initial, coarse estimate of distance, a computer may leverage phase information. In particular, in the presence of a single LOS path, the phase $\phi_k$ on the k-th carrier may be written as a direct function of the distance d:

$$\phi_k = \frac{2\pi}{\lambda_k} d \mod 2\pi \qquad \text{(Equation 5)}$$

where $\lambda_k$ is the wavelength for the k-th carrier.

Leveraging this phase, however, is complicated by multiple factors. First, the phase is measured mod $2\pi$; this creates ambiguity in resolving the distance (mod λ). Second, the above equation assumes a single LOS path and ignores both noise and multipath.

To solve these two challenges, two steps may be taken: First, the initial distance estimate (based on the first large peak in the delay profile) may be employed as a filter to mitigate the impact of multipath and to recover a phase estimate that may be approximated by Equation 5 at each of the frequencies $f_k$. Second, an optimization algorithm may be performed, across the approximate phases calculated at the different frequencies, to mitigate the impact of residual noise and leakage. In what follows, we explain these steps in detail.

To recover phase estimates $\theta_k$ at each of the frequencies $f_k$ while mitigating multipath, a transform may be performed that exploits the LOS estimate of the distance $\tilde{d}_0^c$ as a filter. Specifically, the channels $h_k$ at the different frequencies $f_k$ may be projected on the estimate $\tilde{d}_0^c$ of the channel caused by the LOS path. Such projection may be realized through the following operation:

$$\theta_k = \angle \sum_{i=1}^{K} h_k e^{j\frac{2\pi}{c}(f_i - f_k)\tilde{d}_0^c} \qquad \text{(Equation 6)}$$

where c is the speed of propagation of the signal.

Effectively, this operation (in Equation 6) may reinforce the signal strength for the line-of-sight path and may suppress the signal strength for the multi-path reflections.

In some implementations, an optimization algorithm may be performed to resolve phase ambiguity. The inputs to this optimization algorithm may include: (a), the filtered phases at different frequencies calculated pursuant to Equation 6; and (b) the initial distance estimate. (Recall that an initial distance estimate may be calculated based on the first large peak in a delay profile).

In some implementations, a search for candidate distances is bounded by Equation 4 which limits the potential candidate distances to within a search range of C/B. Rather than searching over an infinite number of potential candidate distances due to the 2π ambiguity of Equation 5, the number of potential candidates from each $\theta_k$ may be:

$$\#\text{candidates} = \frac{c}{B\lambda} \quad \text{(Equation 7)}$$

In some use scenarios: (a) frequency hopping of the sensing signal emulates a bandwidth over B=220 MH; and (b) wavelength λ=33 cm; and (b) thus, the search for candidate distances is, per Equation 7, limited to five candidate distances from each frequency k.

Figure 7:
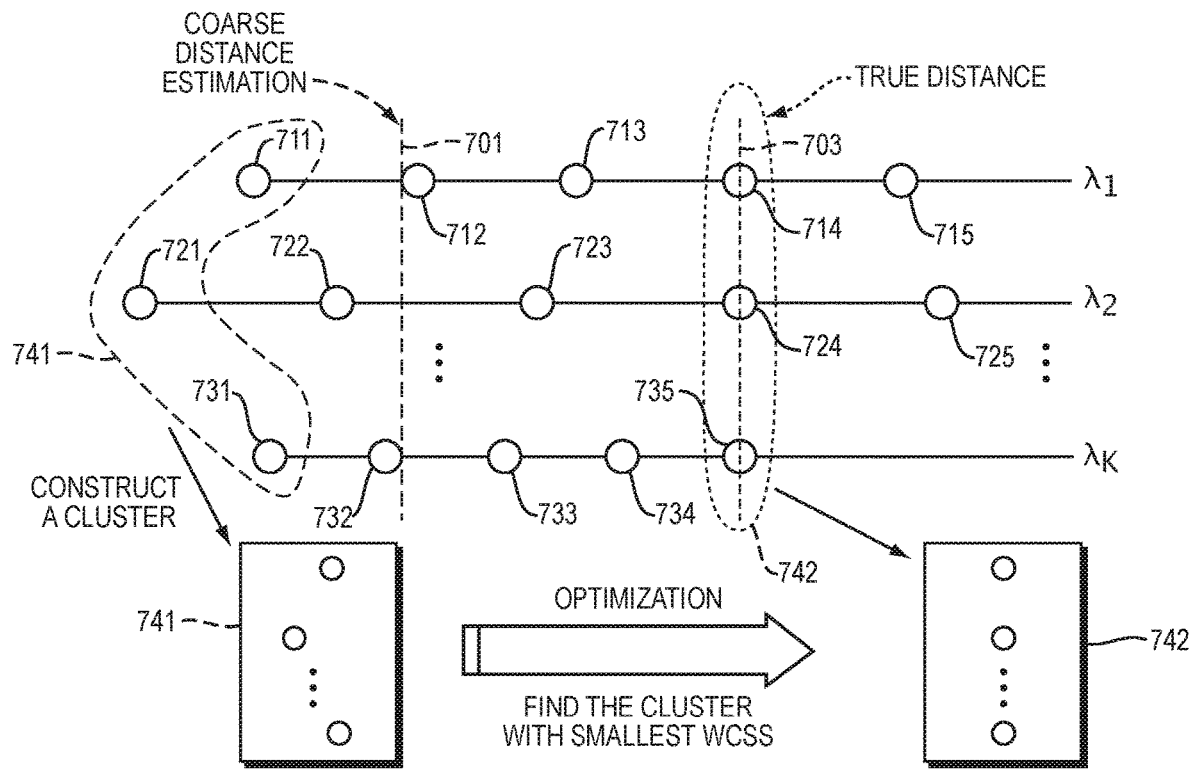
FIG. 7 shows a method of refining an initial distance measurement, by clustering a set of candidate distances and selecting the cluster with the lowest WCSS (within-cluster sum of squares).

FIG. 7 illustrates an optimization function that may be employed to create a more precise (refined) estimate of distance between the RFID reader and RFID tag. FIG. 7 shows five candidate distances at each wavelength $\lambda_k$ (or, equivalently, at each frequency $f_k$). The potential candidates may be clustered into different groups. Each cluster may consist of one candidate from each $\lambda_k$, respectively (or equivalently, one candidate for each frequency $f_k$, respectively). The cluster that has the smallest width may correspond to the true location, since it is the one most robust to noise and leakage.

In some use scenarios, a computer selects different clusters C, each of which consists of one distance estimate from each frequency. Then, it selects the cluster that has the minimum within-cluster sum of squares (WCSS), by performing the following optimization function:

$$\arg\min_{C} = \sum_{d \in C} |\hat{d} - \mu|^2 \quad \text{(Equation 8)}$$

where μ is the mean of the distances in the cluster.

The optimization function in Equation 8 may be solved in linear time by exploiting the fact that the unwrapping function is monotonic across $\lambda_k$. Said differently, a given candidate at $\lambda_{k+1}$ may be mapped to the closest unwrapped candidate at $\lambda_k$.

After identifying the minimum WCSS cluster, a refined, more precise distance estimate may be expressed as:

$$\tilde{d}_0^s = \mu \quad \text{(Equation 9)}$$

Equation 9 estimates distance $\tilde{d}_0^s$ from an RFID tag to a single receiving antenna of an RFID reader. This distance determines a circle in two dimensions and a sphere with a fixed radius in three dimensions. To estimate 2D or 3D location of an RFID tag, two or three receive antennas, respectively, may be employed and trilateration may be performed.

We return now to the discussion of FIG. 7. In FIG. 7, a computer selects a small set of candidate distances (e.g., five candidate distances) for each frequency, respectively, in the frequency hopping. For example, a computer may select: (a) five candidate distances (711, 712, 713, 714, 715) for frequency $\lambda_1$; (b) five candidate distances (721, 722, 723, 724, 725) for frequency $\lambda_2$; and (c) five candidate distances (731, 732 733, 734, 735) for frequency $\lambda_K$. For each frequency, the candidate distances are all near the initial, course distance estimate 701 (which was calculated based on the first large peak in a delay profile, as shown in FIG. 6). In some cases, out of the candidate distances for a given frequency: (a) at least one candidate distance is greater than or equal to the initial distance estimate 701; and (b) at least one candidate distance is less than or equal to the initial distance estimate 701.

In FIG. 7, each candidate distance for a frequency is selected from a set of candidate distances, which are calculated for that frequency in accordance with Equation 5. (Recall that in Equation 5: (a) phase $\theta_k$ repeats every 2π, and (b) thus multiple distances correspond to a single phase $\theta_k$. Thus, Equation 5 allows one to calculate, for phase $\theta_k$ of the $k^{th}$ frequency channel, a set of candidate distances.)

In FIG. 7, a computer identifies clusters of candidate distances. For instance, cluster 741 includes candidate distances 711, 721, 731 and cluster 742 includes candidate distances 714, 724, 735. (In FIG. 7, cluster 741 also includes a candidate distance for each other frequency between $\lambda_2$ and $\lambda_K$ in the frequency hopping, and so does cluster 742). In accordance with Equation 8, a computer calculates which cluster has the smallest WCSS (within cluster sum of squares). The computer may estimate that the distance between the RFID tag and a receiving antenna of the RFID reader is equal to the mean of the distances in the cluster that has the smallest WCSS. This refined estimate may be more accurate (i.e., closer to true distance 703) than is the initial rough estimate.

RFID—Sensing in Complex Domain

In some implementations, the RFID reader senses reflectivity changes in the complex domain rather than only in the amount of reflection power, as is apparent from the following discussion of RFID backscatter.

The reflected electric field $E_{ref}$ that reflects from an RFID tag may be expressed as:

$$E_{ref} \propto E_{inc} \times \gamma \quad \text{(Equation 10)}$$

where $E_{inc}$ is the electric field incident to the tag.

In Equation 10, γ is a complex number, which can be written as $$\gamma = \frac{R_a(f)}{Z_a(f) + Z_c(f)^{eff}} \quad \text{(Equation 11)}$$

where (a) $Z_c^{eff}(f)$ is effective chip input impedance, (b) $Z_a(f)$ is frequency dependent antenna impedance, (c) $Z_a(f)=R_a(f)+jX_a(f)$, and (d) $R_a(f)$ and $X_a(f)$ are the frequency dependent real and imaginary part of antenna impedance, respectively.

The effective chip input impedance is affected by the switching transistor. When the switch is open, $Z_c^{eff}(f)=Z_c(f)$. When the switch is closed, $Z_c \approx 0$. This results in two states of γ:

$$\gamma_{open} = \frac{R_a(f)}{Z_a(f) + Z_c(f)} \text{ and } \gamma_{closed} = \frac{R_a(f)}{Z_a(f)} \quad \text{(Equation 12)}$$

An RFID reader may sense the reflected field difference in the complex domain which may be denoted as $$E_{diff} \propto E_{in}(\gamma_{closed} - \gamma_{open}) \propto E_{in} \frac{R_a(f)X_c(f)}{X_a(f)(X_a(f) + X_c(f))} \quad \text{(Equation 13)}$$

In some implementations, an RFID reader powers up an RFID tag by transmitting a high-power signal inside the ISM band, and the tag powers up and switches its impedance. This switching of complex impedance may be sensed outside the ISM band.

RFID Localization—Illustrative Method

FIGS. 8A and 8B comprise a flowchart for a method of localizing an RFID tag. In the example shown in FIGS. 8A and 8B, the method includes at least the following steps: An RFID reader transmits a first wireless signal at a first frequency that is within an ISM communication band of an RFID tag (902 MHz-928 MHz). The RFID tag harvests RF energy from the first signal. The first signal may have an average EIRP of approximately 36 dBm. The first signal includes a message that triggers the RFID tag to perform switching operations that modulate impedance in the RFID tag. The switching operation may comprise a switch in the RFID tag rapidly changing between an open and closed state. In the open state of the switch, the tag's antenna is less reflective, impedance is high, and power flows into the tag's power harvesting unit. In the closed state of the switch, the tag's antenna is more reflective, impedance is low, and the antenna is grounded (Step 801). While the RFID tag modulates impedance in the tag (and thereby modulates power of RF reflections that reflect from the tag), the RFID reader: (a) transmits a second wireless signal at a second frequency; and (b) takes measurements of reflected RF signals, including reflections of the second signal from the tag. The second signal may be at a much lower power than the first signal (e.g., −13.3 dBm average EIRP). The second signal reflects from the RFID tag and is modulated, in power, by the modulation of impedance in the tag (Step 802). The RFID reader frequency hops the second signal through a wide band of frequencies (e.g., one frequency at a time). For example, the frequency hopping may be in a frequency band that has a bandwidth of at least 200 MHz and that is entirely or partially outside of the ISM band. At each specific frequency in the frequency hopping, respectively, steps 801 and 802 are repeated with the second frequency being equal to the specific frequency. This results in a set of measurements taken by the RFID reader at different times and different frequencies (Step 803). A computer recovers the channels of the second signal at each of the different frequencies (Step 804). A computer calculates an initial distance estimate, by performing an IFRFT (inverse fractional Fourier transform, and then selecting a time-of-flight that corresponds to the first large peak in the resulting delay profile (Step 805). A computer filters the second signal in such a way as to reinforce the signal strength for LOS (line-of-sight) reflections and to reduce the signal strength for NLOS (non-line-of-sight) multipath reflections. This filtering is performed for each frequency channel of the second signal (Step 806). Based on phase, a computer estimates, for each frequency channel of the second signal, a small number of candidate distances (between reader and tag) that are close to the initial distance estimate (Step 807). A computer identifies clusters of the candidate distances (one candidate distance per frequency channel), selects the cluster which has the smallest WCSS (within-cluster sum of squares), and then calculates a refined estimate of distance (between reader and tag). This refined estimate of distance is equal to the mean of the distances in the selected cluster, and is usually more precise (closer to actual distance) than the initial distance estimate (Step 808). A computer may, based on measurements taken by one antenna of the RFID reader, calculate distance between reader and tag. A computer may, based on measurements taken by two antennas of the RFID reader, calculate 2D location of the tag. A computer may, based on measurements taken by three antennas of the RFID reader, calculate 3D location of the tag. In each case, the computer may employ one or more refined distance estimates from step 808 (Step 809).

RFID—Prototype

The following seven paragraphs describe an RFID prototype of this invention.

In this prototype, an RFID reader uses two USRPs (universal software radio peripherals) with SBX daughterboards. In this prototype: (a) the first USRP transmits at 30 dBm at a frequency $f_p$ for power delivery and communication; and (b) the second USRP transmits a sensing frequency $f_s$ at extremely low power (with an average radiation power at −15 dBm and a peak power at −3 dBm and sweeps it over 220 MHz bandwidth. These transmit powers are compliant with FCC regulations for consumer electronics. The two USRPs are synchronized by an external clock.

In this prototype, to perform 3D localization, an RFID reader uses three USRP N210, each with a patch antenna, an external receive chain, and an LFRX daughterboard.

In this prototype, the external receive chain performs coherent decoding. The receive chain comprises a filter, a variable gain low noise amplifier (LNA), and an I/Q mixer. The filter eliminates strong leakage from the power delivery carrier $f_p$, and helps mitigate self-jamming and reduce phase noise induced by the high-power self-leakage from $f_p$. After filtering, the received signal is amplified by an LNA and down-converted to baseband by mixing with the sensing frequency $f_s$ through an I/Q mixer that feeds to an LFRX daughterboard of the USRP. The USRPs samples baseband I/Q signals which are postprocessed in MATLAB.

In this prototype, Matlab® software incorporates a Chebyshev-I digital bandpass filter that rejects residual low-frequency noise and then performs matched filtering to recover the channel estimates. A one-time calibration is performed to account for over-the-wire offsets and for changes in the reflection coefficient at different frequencies. The estimated channels are divided by those acquired during the calibration step. Then the channels are processed according to the algorithms described in the above "RFID-Localization" section, to obtain a tag's 3D location.

This prototype was evaluated in a series of tests. These tests were performed in multi-path rich indoor environments, including both LOS (line of sight) and NLOS (non-line of sight) settings. Specifically, the tests were performed in an office building with different types of indoor reflectors including tables, chairs, computers, ceilings, and walls. The testing environment comprised an office area that is 10 meters×12 meters. Localization experiments were performed in multiple sites in this office area against different multipath backgrounds. The office area included office cubicles that were separated by dividers consisting of 20 cm thick 2 m-tall separators made of two layers of wood. For NLOS experiments, these separators ensured that there was no LOS path between the reader's antennas and the localized RFIDs. In these tests: (a) the RFID reader's three receive antennas were separated by 20 cm from a transmit antenna of the reader; and (b) the RFID tags comprised Alien Squiggle™ RFID tags.

A series of 150 tests were performed (in the above environment) regarding the prototype's ability to accurately determine the 2D location of an RFID tag. In these tests, the prototype achieved a median accuracy of 0.91 cm and a 90th percentile accuracy of 1.92 cm in 2D localization.

In addition, a series of 160 tests were performed (in the above environment) regarding the prototype's ability to accurately determine the 3D location of an RFID tag. Out of these 160 tests, 80 were performed LOS settings and 80 were performed in NLOS settings. In these tests, in both LOS and NLOS settings, the prototype achieved a median error that was less than 1.1 cm along each of the x, y, and z dimensions. Moreover, even the 90th percentile error was less than 2 cm in the x and y dimensions, and less than 4 cm in the z dimension. The accuracy in LOS was higher than in NLOS settings. Such a result is expected since the SNR of the line-of-sight path degrades in NLOS, resulting in lower accuracy. (In this paragraph and the preceding paragraph, the "90th percentile error" means a value such that 90 percent of the measurements have an error smaller than or equal to that value.)

The prototype described in the preceding seven paragraphs is a non-limiting example of this invention. This invention may be implemented in many other ways.

Backscatter Nodes, Generally

This invention is not limited to RFID systems.

In illustrative implementations of this invention, the 1D, 2D or 3D spatial coordinates of a backscatter node are detected based on time-of-flight (or phase) of radio signals that reflect from, and are modulated by, the backscatter node.

In illustrative implementations of this invention, the backscatter node may be of any type.

In some cases, the backscatter node comprises a device (such as a Wi-Fi transceiver, a Bluetooth® transceiver, or a Zigbee® transceiver) that is itself configured to actively transmit signals in a communication band, and that is also configured to reflect (and modulate) RF signals that are incident on the device.

In other cases, the backscatter node comprises a device (such as a passive RFID tag) that is not itself configured to actively transmit signals, but that is configured to reflect (and modulate) RF signals that are incident on the device.

In some cases, the backscatter node is configured to harvest RF energy. For example, the backscatter node may comprise a sensor (or an RFID tag) that obtains all or part of its power by harvesting RF energy.

In other cases, the backscatter node is not configured to harvest RF energy, and instead obtains all its power from other sources such as an electric power cord or a battery.

In illustrative implementations, the backscatter node is configured to modulate RF signals that reflect from the backscatter node. For instance, the backscatter node may include one or more switches (e.g., transistors) that are configured to perform switching operations. These switching operations may, in turn, modulate complex impedance in an antenna of the backscatter node (e.g., modulate impedance in a circuit that is electrically connected to an antenna of the backscatter node). This modulation of impedance may, in turn, modulate the reflectivity of this antenna, thereby modulating an RF signal that reflects from this antenna of the backscatter node.

In some implementations, the modulation of impedance causes the reflectivity of an antenna of the backscatter node to switch repeatedly between a first, more reflective state and a second, less reflective state. The modulation pattern may be of any type, and of any duty cycle. For instance, the switching between less and more reflective states may result in a modulation pattern that approximates a square wave, similar to that shown in FIG. 1B. Or, for instance, the switching between less and more reflective states may result in a modulation pattern that approximates a pulse train, in which the reflectivity is at a constant, single value except during pulses.

In illustrative implementations, a transceiver transmits two wireless signals: (a) a communication signal at frequency $f_p$; and (b) a sensing signal at frequency $f_s$. The communication signal may be employed for communication with (and if applicable, wireless power delivery to) the backscatter node. The sensing signal may be employed for sensing the location of the backscatter node.

In illustrative implementations, the communication signal includes a command that triggers the backscatter node to perform switching operations. These switching operations may modulate the complex impedance of an antenna in the backscatter node. For instance, if the backscatter node is an RFID tag, then the communication signal may include a command that directly or indirectly causes a transistor in the tag to switch repeatedly between an open switch state (in which power flows into the tag's power harvesting unit, impedance is high, and the tag is less reflective) and a closed switch state (in which the tag's antenna is grounded, impedance is low, and the tag is more reflective). Or, for instance, if the backscatter node is a Wi-Fi device, then the communication signal may include a command that directly or indirectly causes an NIC (network interface card) in the Wi-Fi device to switch repeatedly between an "on" state and an "off" state. These changes in state of the NIC may in turn cause changes in impedance in an antenna of the Wi-Fi device. For example, the communication signal may cause a microcontroller in the Wi-Fi device to output instructions that cause the NIC to switch on and off.

In some implementations, the transceiver transmits the communication signal to a backscatter node at a single, constant frequency that is within a frequency band that is conventionally employed for communication with that type of backscatter node. For instance, in the case of an RFID tag, the communication signal may be in the 902-928 MHz ISM band. Or, for instance, in the case of a Wi-Fi device, the communication signal may (in some cases) be at a specific frequency in the 2.4 GHz-2.5 GHz spectrum and the Wi-Fi device may be configured to communicate in a narrow channel that includes that specific frequency.

In illustrative implementations, the transceiver frequency hops the sensing signal through different frequencies in a wide band of frequencies. For example, the wide band of frequencies may have a finite bandwidth of at least 20 MHz. Or, for instance, the wide band of frequencies may have a finite bandwidth that is: (a) at least 100 MHz; (b) at least 200 MHz; (c) at least 300 MHz; (d) at least 400 MHz; (e) at least 1 GHz; or (f) at least 2 GHz. Or, for instance, the wide band of frequencies may have a bandwidth that is: (a) greater than or equal to 20 MHz and less than 100 MHz; (b) greater than or equal to 100 MHz and less than 200 MHz; (c) greater than or equal to 200 MHz and less than 300 MHz; (d) greater than or equal to 300 MHz and less than 400 MHz; (e) greater than or equal to 400 MHz and less than 1 GHz; or (f) greater than or equal to 1 GHz and less than 2 GHz.

In illustrative implementations, frequency hopping may be performed in any pattern. For instance, frequency hopping may be performed in discrete, equidistant steps, or may involve random hops. For instance, during the frequency hop, the frequency of the sensing signal: (a): may vary in discrete steps or continuously; (b) may monotonically increase or monotonically decrease; (c) may vary in any order, including randomly or psuedorandomly; or (d) may vary in equidistant steps or in non-equidistant steps. In the frequency hopping, the sensing signal may be transmitted one frequency at a time. Or, in the frequency hopping, the sensing signal may be transmitted at multiple frequencies at a time. At all times during the frequency hop, the sensing signal may be at a different frequency than that of the communication signal.

The transceiver may transmit the sensing signal at a different power than the communication signal. In some cases, the sensing signal has a lower power than the communication signal. For instance, an RFID reader may transmit the communication signal at an average EIRP of 36 dBm and may transmit the sensing signal at an average EIRP of −13.3 dBm. In some cases, the transceiver transmits the sensing signal at a power that is equal to, or greater than, the power at which the transceiver transmits the communication signal.

The transceiver may transmit the sensing signal while the backscatter node is modulating impedance of an antenna of the backscatter node. (As noted above, this modulation may be in response to a command in the communication signal).

In some cases, the transceiver: (a) transmits the sensing signal and communication signal simultaneously during a portion of a communication protocol; and (b) transmits only the communication signal during other portions of the communication protocol.

Alternatively, in some cases, the transceiver transmits the sensing signal and communication signal in such a way that: (a) the two signals always occur at the same time; or (b) the two signals never occur at the same time.

In any scenario, the transceiver may transmit the sensing signal at a time when the backscatter node is modulating impedance in response to a command that occurred earlier in a communication signal.

In some implementations, the sensing signal is a carrier for a third signal. For instance, the third signal (which is carried by a reflected sensing signal) may comprise the modulation pattern created by changes in impedance in the backscatter node.

In some cases, the sensing signal (as transmitted by the transceiver) comprises a single carrier. In other cases, the sensing signal (as transmitted by the transceiver) comprises a rapidly modulated signal such as a Wi-Fi signal or Bluetooth® signal. Modulation by the backscatter node (e.g., by an RFID tag) during reflection from the backscatter node may create a relatively slower time-varying envelope which may later be decoded.

In illustrative implementations of this invention, the transceiver takes measurements of reflected RF signals (including reflections from the backscatter node), while the transceiver is transmitting each frequency in the frequency hopping, respectively.

Based on these measurements, a computer may extract a signal from the backscatter node. For instance, the computer may apply any channel estimation technique to recover a channel at each frequency in the frequency hopping, respectively.

In some implementations, a computer calculates that the channel for each specific frequency of the sensing signal in the frequency hopping, respectively, is equal to a cross-correlation of (i) a known portion (e.g., preamble) of the backscatter node's response and (ii) a signal received by the transceiver while the transceiver transmitted the sensing signal at the specific frequency.

In illustrative implementations, a computer calculates, based on measurements taken by the transceiver, 1D, 2D or 3D spatial coordinates of the backscatter. To do so, the computer may perform any localization algorithm, including any algorithm that: (a) calculates any absolute or relative distance or distance metric based on phase or time-of-flight of a received signal; or (b) calculates, by trilateration or by triangulation, any absolute or relative distance, distance metric, 2D spatial coordinate, or 3D spatial coordinate.

In some implementations, a computer computes an initial distance estimate based on time-of-flight (or phase) along a LOS (line-of-sight) path between the transceiver and the backscatter node.

To do so, a computer may calculate a delay profile, which specifies normalized power as a function of time-of-flight. To calculate the delay profile, a computer may perform an Inverse Fourier Transform (e.g., an Inverse Fractional Fourier Transform) that transforms a frequency domain representation of measurements (taken at different frequencies during the frequency hop) into the time domain. The normalized powers in the delay profile may be calculated by dividing each un-normalized power by the peak power, thereby causing the largest normalized power in the delay profile to be equal to 1.

In some implementations, a computer may select the first (in time) peak in the delay profile that is above a certain threshold of normalized amplitude. The computer: (a) may compute a distance that corresponds to the time-of-flight for this peak; and (b) may set the initial distance estimate equal to this distance.

Advantageously, in some implementations, the wide bandwidth (in which frequency hopping of the sensing signal occurs) allows sufficient time resolution to separate the peak due to the LOS path (which occurs first in time) from peaks due to NLOS paths (which occur later in time, because a signal travels further in a NLOS path than in a LOS path).

In some implementations, a computer then calculates a more precise estimate of distance between the transceiver and backscatter node, again based on time-of-flight or phase.

To do so, a computer may: (a) calculate, for each frequency $f_k$ in the frequency hopping, a phase $\theta_k$ of a channel $h_k$ of the sensing signal; (b) filter each channel $h_k$ in such a way as to increase the signal strength due to LOS path and reduce the signal strength due to NLOS paths; (c) calculate, for each frequency $f_k$ in the frequency hopping, a small number of candidate distances (e.g., five candidate distances) at which the phase of channel $h_k$ would be $\theta_k$; (d) calculate clusters of the candidate distances, in such a way that each cluster contains one candidate distance for each frequency $f_k$, respectively; (e) select the cluster that has the smallest WCSS (within-cluster sum of squares (e.g., this selection may be made in accordance with Equation 8); and (e) set the more precise estimate of distance equal to the mean of the distances in the selected cluster.

In some cases, a computer calculates distance between the backscatter node and each of the transceiver's one or more receive antennas, respectively. The computer may, based on these distances, calculate 1D, 2D or 3D position of the backscatter node, by employing trilateration or triangulation.

For instance, in some cases, 3D position of the backscatter node is calculated as follows: (a) the transceiver has three receive antennas; (b) the computer calculates, for each receive antenna respectively, a sphere that is centered at the receive antenna and that has a radius equal to the distance between the backscatter node and the receive antenna; and (c) the computer calculates that the 3D position of the backscatter node is located where the spheres for the three receive antennas intersect.

Likewise, in some cases, 2D position of the backscatter node is calculated as follows: (a) the transceiver has two receive antennas; (b) the computer calculates, for each of receive antenna respectively, a circle that is centered at the receive antenna and that has a radius equal to the distance between the backscatter node and the receive antenna; and (c) the computer calculates that the 2D position of the backscatter node is located where the circles for the two receive antennas intersect.

Likewise, in some cases, 1D position of the backscatter node is calculated as follows: (a) the transceiver has one receive antenna; and (b) the computer calculates distance between the backscatter node and the receive antenna.

In illustrative implementations, the locations of multiple backscatter nodes may be determined, based on measurements (taken by the transceiver) of reflections from these backscatter nodes. For instance, a communication protocol (e.g., an ALOHA protocol) may be employed to single out one backscatter node at a time. By detecting one backscatter node at a time, the locations of multiple backscatter nodes may be determined. Also, for instance, each of the backscatter nodes may have a unique modulation pattern, and the signals from the different backscatter nodes may be disentangled based on these unique modulation patterns.

Figure 9:
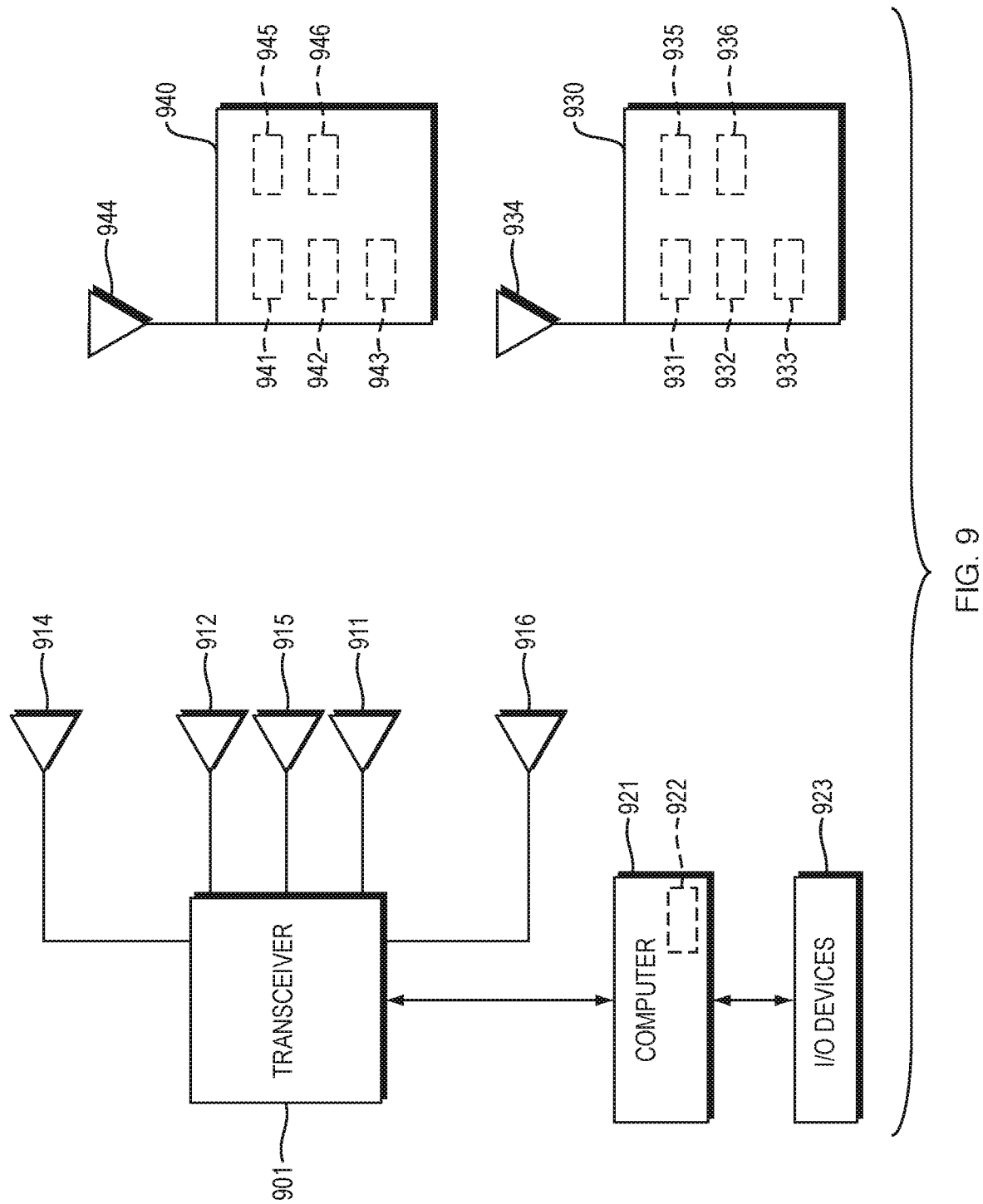
FIG. 9 shows hardware of a system that is configured to determine the location of one or more backscatter nodes.

FIG. 9 shows hardware of a system that is configured to determine the location of one or more backscatter nodes.

In FIG. 9, backscatter nodes 930, 940 may each comprise any kind of backscatter node. For instance, backscatter nodes 930, 940 may each comprise an RFID tag, a Wi-Fi transceiver, a Bluetooth® transceiver, a Zigbee® transceiver, an RF-energy harvesting sensor, or any other device that receives power by wireless power transfer.

In FIG. 9, backscatter node 940 includes: (a) antenna 944; (b) one or more switches (e.g., 941, 942, 943) that are configured to perform switching operations; (c) a computer (e.g., microcontroller) 945, and (d) memory device 946. Likewise, backscatter node 930 includes: (a) antenna 934; (b) one or more switches (e.g., 931, 932, 933) that are configured to perform switching operations; (c) a computer (e.g., microcontroller) 935, and (d) memory device 936.

In FIG. 9, the switching operations performed by the one or more switches modulate impedance inside a backscatter node (e.g., impedance of a circuit that is electrically connected to an antenna of the backscatter node). Modulating impedance in a backscatter node in turn causes a modulation of the power of RF signals that reflect from the backscatter node.

In FIG. 9, transceiver 901 transmits a first signal at a first frequency via antenna 911 and transmits a second signal at a second frequency via antenna 912. Transceiver 901 also employs three antennas 914, 915, 916 for receiving reflected RF signals. Measurements taken by these three receive antennas 914, 915, 916 enable computer 921 to determine 3D coordinates of a backscatter node. Alternatively, transceiver 901 may employ only two antennas for receiving (e.g., 914, 916), and thus enable computer 921 to determine 2D coordinates of a backscatter node. Alternatively, transceiver 901 may employ only one antennas for receiving (e.g., 915), and thus enable computer 921 to determine distance between transceiver 901 and a backscatter node. In some cases, the number of antennas may be reduced by using one or more circulators.

In FIG. 9, transceiver 901 may frequency hop the second signal (e.g., one frequency at a time) and may take measurements of RF reflections at each of the frequencies in the frequency hopping. For a given backscatter node, the reflections of the second signal from the give backscatter node may be modulated (e.g., in power) due to modulation of impedance in the given backscatter node. This modulation in impedance may be due to switching operations that are triggered by the first signal.

In FIG. 9, computer 921 may interface with and control transceiver 901. Computer 921 may include a memory device 922. Furthermore, computer 921 may interface with or control one or more I/O devices 923, which are configured to receive input from a user or to provide output to a user. For instance, I/O devices 923 may include one or more of a touch screen, electronic display screen, mouse, keyboard, microphone, speaker and camera.

The hardware shown in FIG. 9 may be employed to determine the location of backscatter nodes 930, 940, by using any localization algorithm.

FIG. 10 is a flowchart for a method of determining the 1D, 2D or 3D location of a backscatter node. In the example shown in FIG. 10, the method includes at least the following steps: A transceiver transmits a first wireless signal at a first frequency that is within the communication band of a backscatter node. In some cases, the backscatter node harvests RF energy from the first signal. The first signal includes a message that triggers the backscatter node to perform switching operations that modulate impedance in the backscatter node (Step 1001). While the backscatter node modulates impedance in the backscatter node (and thereby modulates amplitude of RF reflections that reflect from the backscatter node), the transceiver: (a) transmits a second wireless signal at a second frequency; and (b) takes measurements of reflected RF signals, including reflections of the second signal from the backscatter node. The second signal may be at a much lower power than the first signal. The second signal reflects from the backscatter node and is modulated, in power, by the modulation of impedance in the backscatter node (Step 1002). The transceiver frequency hops the second signal through a wide band of frequencies (e.g., one frequency at a time). For example, the frequency hopping may be in a frequency band that has a bandwidth of at least 200 MHz and that is entirely or partially outside of the communication band of the backscatter node. At each specific frequency in the frequency hopping, respectively, steps 1001 and 1002 are repeated with the second frequency being equal to the specific frequency. This results in a set of measurements taken by the transceiver at different times and different frequencies (Step 1003). A computer extracts, from the measurements, the reflected second signal from the backscatter node at the different frequencies of the frequency hopping. Based on this extracted signal, a computer estimates phase or time-of-flight of the second signal and calculates 1D, 2D or 3D spatial coordinates of the backscatter node (Step 1004).

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a transceiver (e.g., an RFID reader); (2) to control the frequency and timing of wireless signals transmitted by a transceiver, including to cause the transceiver to transmit a communication (and/or power) signal at a first frequency and a sensing signal at a second frequency; (3) to cause a transceiver to frequency hop the sensing signal; (4) to cause a transceiver to include a command in the communication signal that causes a backscatter node to modulate impedance in an antenna of the backscatter node (and thereby modulate reflectivity of the backscatter node); (5) to cause the transceiver, while the impedance is being modulated, to transmit the sensing signal and measure reflected RF signals; (6) to extract, from the measurements, reflections from the backscatter node, such as by performing any channel estimation technique; (7) to estimate a channel for each frequency in the frequency hopping, (8) to perform any localization algorithm; (9) to receive data from, control, or interface with one or more sensors; (10) to perform any other calculation, computation, program, algorithm, or computer function described or implied herein; (11) to receive signals indicative of human input; (12) to output signals for controlling transducers for outputting information in human perceivable format; (13) to process data, to perform computations, and to execute any algorithm or software; and (14) to control the read or write of data to and from memory devices (tasks 1-14 of this sentence referred to herein as the "Computer Tasks"). The one or more computers (e.g. 921) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 901, 921) are configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 921) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

Backscatter node" means an object that backscatters a radio signal. Non-limiting examples of a "backscatter node" include: (a) an RFID tag that backscatters a radio signal; and (b) an object that backscatters a radar signal.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

To compute "based on" specified data means to perform a computation that takes the specified data as an input.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

"EIRP" means effective isotropic radiated power.

Each equation above is referred to herein by the equation number set forth to the right of the equation. For example: "Equation 1" means Equation 1 above; and "Equation 6" means Equation 6 above. Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

A non-limiting example of a device "harvesting RF energy" is the device obtaining at least a portion of its power by harvesting RF energy.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"ISM radio frequency band" means any of the following frequency bands: (a) 6.765 MHz to 6.795 MHz; (b) 13.553 MHz to 13.567 MHz; (c) 26.957 MHz to 27.283 MHz; (d) 40.66 MHz to 40.7 MHz; (e) 433.05 MHz to 434.79 MHz; (f) 902 MHz to 928 MHz; (g) 2.4 GHz to 2.5 GHz; (h) 5.725 GHz to 5.875 GHz; (i) 24 GHz to 24.25 GHz; (j) 61 GHz to 61.5 GHz; (k) 122 GHz to 123 GHz; and (1) 244 GHz to 246 GHz.

The term "or" is inclusive, not exclusive. For example, A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Power delay profile" means a set of data that specifies power (or a value that is derived from power) as a function of time. A non-limiting example of a "power delay profile" is a set of data that specifies normalized power as a function of time-of-flight.

"Radio energy harvesting device" means a device that is configured to harvest energy from wireless radio signals. Non-limiting examples of a "radio energy harvesting device" include: (a) a device that is configured to harvest energy from wireless radio signals and from other sources; and (b) a device that is configured to be partially powered by wireless radio signals.

A "reading" means a measurement.

"RF" means radio frequency.

As used herein, the term "set" does not include a group with no elements.

A "set of different values of" X means a set of values of X, each value in the set being different than each other value in the set.

Unless the context clearly indicates otherwise, "some" means one or more.

As used herein, a "subset" of a set consists of less than all of the elements of the set.

To "sweep" a signal means to transmit the signal in such a way that frequency of the signal changes over time. Non-limiting examples of "sweeping" a signal include: (a) varying frequency of the signal in discrete steps or continuously; (b) monotonically increasing or monotonically decreasing frequency of the signal; (c) varying frequency of the signal in any order, including in a pseudorandom sequence of frequencies; and (d) varying frequency of the signal in equidistant steps or in non-equidistant steps.

The term "such as" means for example.

"Time-of-flight between" X and Y means a length of time that a wireless radio signal would take: (a) to travel from X to Y; or (b) to travel in a roundtrip that consists of traveling from X to Y and then traveling from Y to X. A non-limiting example of "time-of-flight between" X and Y is a length of time that a wireless radio signal would take to travel from X to Y in a straight path. Another non-limiting example of "time-of-flight between" X and Y is a length of time that a wireless radio signal would take to travel from X to Y in an indirect path in which the signal reflects from one or more objects while traveling from X to Y.

A transceiver is a non-limiting example of a "receiver".

"Transceiver" means a device that includes both a transmitter and a receiver. Nonlimiting examples of a transceiver include: (a) a device in which a transmitter and a receiver share common circuitry; (b) a device that houses both a transmitter and a receiver in a single housing; or (c) a device that includes both a transmitter and a receiver, wherein the transmitter and transceiver do not share common circuitry and are not housed together in a single housing.

To say that a machine-readable medium is "transitory" means that the medium is a transitory signal, such as an electromagnetic wave.

A non-limiting example of an event that occurs "while changes in impedance are occurring" is an event that occurs during a temporal sequence of changes in impedance in a backscatter node, which sequence is triggered by a command, even though the event occurs between two changes of impedance in the sequence. Likewise, a non-limiting example of an event that occurs "at a time at which changes in impedance are occurring" is an event that occurs during a temporal sequence of changes in impedance in a backscatter node, which sequence is triggered by a command, even though the event occurs between two changes of impedance in the sequence.

Unless the context clearly indicates otherwise, "while A and B" means while A and B are both occurring.

"Wireless command" means a signal that is wirelessly transmitted and that encodes a command.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is an apparatus that comprises: (a) a transceiver; and (b) one or more computers, wherein (i) the transceiver is configured (A) to wirelessly transmit a first radio signal at a first frequency, the first signal encoding a command, (B) to wirelessly transmit a second radio signal at a second frequency, the second frequency being different than the first frequency, and (C) to take measurements of reflections of the second radio signal, including reflections from a backscatter node, while (I) the apparatus is transmitting the second radio signal at the second frequency and (II) changes in impedance are occurring, in response to the command, in the backscatter node, and (ii) the one or computers are programmed to extract, from the measurements, a signal from the backscatter node. In some cases, the transceiver is configured to transmit the second signal at an average EIRP that is less than or equal to −13.3 dBm. In some cases, the first frequency is in an ISM radio frequency band. In some cases, the second signal is a Wi-Fi signal. In some cases, the second signal is a Bluetooth signal. In some cases, the second signal is a Zigbee signal. In some cases, the transceiver is configured to wirelessly transmit the second signal in such a way that the second signal, as transmitted by the transceiver, is a carrier signal that carries a third signal. In some cases, the transceiver is configured to wirelessly transmit the first signal at the first frequency and simultaneously to wirelessly transmit the second signal at the second frequency. In some cases, the one or computers are programmed to calculate, based on the measurements, a location of the backscatter node. In some cases: (a) the transceiver is configured to sweep the second frequency and take a set of readings during the sweep in such a way that (i) the second frequency changes during the sweep, and (ii) for each value, respectively, in a set of different values of the second frequency during the sweep, the transceiver takes the actions described in clause (i) of the first sentence of this paragraph; and (b) the one or computers are programmed to calculate, based on the set of readings, a location of the backscatter node. In some cases, the one or computers are programmed to calculate, based on the set of readings, a power delay profile. In some cases, the one or more computers are programmed: (a) to identify, in the power delay profile, a specific peak of normalized power; and (b) to estimate, for the specific peak, a time-of-flight between the transceiver and the backscatter node. In some cases: (a) the power delay profile includes a set of peaks of normalized power, including the specific peak, that are each above a specific threshold of normalized power; (b) normalized power at each of the peaks, respectively, is a function of time-of-flight; and (c) the time-of-flight for the specific peak is smaller than the time-of-flight for each other peak, respectively, in the set of peaks. In some cases: (a) the power delay profile includes a set of peaks of normalized power, including the specific peak, that are each above a specific threshold of normalized power; and (b) the normalized power for the specific peak is greater than the normalized power for each other peak, respectively, in the set of peaks. In some cases: (a) the second frequency is a member of a set of frequencies, each frequency in the set of frequencies being different than the first frequency; and (b) the apparatus is configured in such a way that for each specific frequency in the set of frequencies, respectively, the apparatus wirelessly transmits the second radio signal at the specific frequency at a time at which the changes in impedance are occurring. In some cases, the bandwidth of the set of frequencies is at least 20 MHz. In some cases, the one or computers are programmed to estimate phase of the second signal for each frequency in the set of frequencies, respectively. Each of the cases described above in this paragraph is an example of the apparatus described in the first sentence of this paragraph, and is also an example of an embodiment of this invention that may be combined with other embodiments of this invention.

In some implementations, this invention is an apparatus that comprises: (a) a receiver; and (b) one or more computers, wherein (i) the receiver is configured to take measurements of reflections of a radio signal while (A) the radio signal is at a first frequency, and (B) a backscatter node is changing impedance in response to a wireless command, the wireless command being at a different frequency than the first frequency, and (ii) the one or more computers are programmed to extract, from the measurements, a signal from the backscatter node. In some cases, the one or more computers are programmed to calculate, based on the signal from the backscatter node, one-dimensional, two-dimensional or three-dimensional spatial coordinates of the backscatter node. Each of the cases described above in this paragraph is an example of the apparatus described in the first sentence of this paragraph, and is also an example of an embodiment of this invention that may be combined with other embodiments of this invention.

In some implementations, this invention is an apparatus that comprises: (a) a transceiver; and (b) one or more computers, wherein (a) the transceiver is configured to simultaneously (i) transmit a first radio signal at a first frequency, (ii) sweep a second radio signal through a band of frequencies, which band includes frequencies other than the first frequency, and (iii) take measurements of reflections of the second signal, which reflections include reflections that reflect from a radio frequency energy harvesting device that harvests energy from the first signal; and (b) the one or more computers are programmed to calculate, based on the measurements, one-dimensional, two-dimensional or three-dimensional spatial coordinates of the energy harvesting device. The embodiment of this invention that is described is this paragraph may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described herein.

What is claimed:

1. An apparatus that comprises:
   (a) a transceiver; and
   (b) one or more computers,
   wherein
   (i) the transceiver is configured
      (A) to wirelessly transmit a first radio signal at a first frequency, the first signal encoding a command,
      (B) to wirelessly transmit a second radio signal at a second frequency, the second frequency being different than the first frequency, and
      (C) to take measurements of reflections of the second radio signal, including reflections from a backscatter node, while (I) the apparatus is transmitting the second radio signal at the second frequency and (II) changes in impedance are occurring, in response to the command, in the backscatter node, and
   (ii) the one or computers are programmed to extract, from the measurements, a signal from the backscatter node.

2. The apparatus of claim 1, wherein the transceiver is configured to transmit the second signal at an average EIRP that is less than or equal to −13.3 dBm.

3. The apparatus of claim 1, wherein the first frequency is in an ISM radio frequency band.

4. The apparatus of claim 1, wherein the second signal is a Wi-Fi signal.

5. The apparatus of claim 1, wherein the second signal is a Bluetooth signal.

6. The apparatus of claim 1, wherein the second signal is a Zigbee signal.

7. The apparatus of claim 1, wherein the transceiver is configured to wirelessly transmit the second signal in such a way that the second signal, as transmitted by the transceiver, is a carrier signal that carries a third signal.

8. The apparatus of claim 1, wherein the transceiver is configured to wirelessly transmit the first signal at the first frequency and simultaneously to wirelessly transmit the second signal at the second frequency.

9. The apparatus of claim 1, wherein the one or computers are programmed to calculate, based on the measurements, a location of the backscatter node.

10. The apparatus of claim 1, wherein:
    (a) the transceiver is configured to sweep the second frequency and take a set of readings during the sweep in such a way that
       (i) the second frequency changes during the sweep, and
       (ii) for each value, respectively, in a set of different values of the second frequency during the sweep, the transceiver takes the actions described in clause (i) of claim 1; and
    (b) the one or computers are programmed to calculate, based on the set of readings, a location of the backscatter node.

11. The apparatus of claim 10, wherein the one or computers are programmed to calculate, based on the set of readings, a power delay profile.

12. The apparatus of claim 11, wherein the one or more computers are programmed:
    (a) to identify, in the power delay profile, a specific peak of normalized power; and
    (b) to estimate, for the specific peak, a time-of-flight between the transceiver and the backscatter node.

13. The apparatus of claim 12, wherein:
    (a) the power delay profile includes a set of peaks of normalized power, including the specific peak, that are each above a specific threshold of normalized power;
    (b) normalized power at each of the peaks, respectively, is a function of time-of-flight; and
    (c) the time-of-flight for the specific peak is smaller than the time-of-flight for each other peak, respectively, in the set of peaks.

14. The apparatus of claim 12, wherein:
    (a) the power delay profile includes a set of peaks of normalized power, including the specific peak, that are each above a specific threshold of normalized power; and
    (b) the normalized power for the specific peak is greater than the normalized power for each other peak, respectively, in the set of peaks.

15. The apparatus of claim 1, wherein:
    (a) the second frequency is a member of a set of frequencies, each frequency in the set of frequencies being different than the first frequency; and
    (b) the apparatus is configured in such a way that for each specific frequency in the set of frequencies, respectively, the apparatus wirelessly transmits the second radio signal at the specific frequency at a time at which the changes in impedance are occurring.

16. The apparatus of claim 15, wherein the bandwidth of the set of frequencies is at least 20 MHz.

17. The apparatus of claim 15, wherein the one or computers are programmed to estimate phase of the second signal for each frequency in the set of frequencies, respectively.

* * * * *